United States Patent [19]

Eaves et al.

[11] Patent Number: 4,604,704
[45] Date of Patent: Aug. 5, 1986

[54] HIGH-SPEED MICROPROCESSOR-CONTROLLED BRANCH CONVEYOR

[75] Inventors: Fred W. Eaves, Clayton; Wayne D. Sommer, Amery, both of Wis.

[73] Assignee: Doboy Packaging Machinery, Inc., New Richmond, Wis.

[21] Appl. No.: 649,173

[22] Filed: Sep. 10, 1984

[51] Int. Cl.⁴ .................. G06F 15/20; B65G 43/10
[52] U.S. Cl. ............................ 364/478; 364/468;
    198/460; 198/572; 198/575; 198/577; 198/579;
    209/586; 209/587; 209/644; 53/493; 53/495
[58] Field of Search ............. 364/468, 469, 478, 479;
    198/460, 572, 575, 577, 579; 53/493-495;
    209/586, 587, 644

[56] References Cited

U.S. PATENT DOCUMENTS

| | | | |
|---|---|---|---|
| 3,703,725 | 11/1972 | Gomersall et al. | 364/478 |
| 3,817,368 | 6/1974 | Wentz et al. | 198/572 |
| 3,884,343 | 5/1975 | Stephens et al. | 198/572 |
| 4,166,525 | 9/1979 | Bruno | 198/572 |
| 4,187,545 | 2/1980 | Wallace et al. | 364/478 |
| 4,195,347 | 3/1980 | MacMunn et al. | 364/478 |
| 4,227,607 | 10/1980 | Malavenda | 198/460 |
| 4,281,756 | 8/1981 | Bruno | 198/369 |
| 4,281,757 | 8/1981 | Morton | 198/369 |
| 4,349,112 | 9/1982 | Wilks et al. | 209/586 |
| 4,360,098 | 11/1982 | Nordstrom | 198/575 |
| 4,394,896 | 7/1983 | McComas et al. | 198/572 |
| 4,484,289 | 11/1984 | Hemond | 364/478 |
| 4,495,584 | 11/1985 | Yoshida | 364/479 |
| 4,507,908 | 4/1985 | Seragnoli | 198/572 |
| 4,514,963 | 5/1985 | Bruno | 198/572 |
| 4,515,275 | 5/1985 | Mills et al. | 209/586 |

Primary Examiner—Jerry Smith
Assistant Examiner—John R. Lastova
Attorney, Agent, or Firm—Orrin M. Haugen; Thomas J. Nikolai

[57] ABSTRACT

A multi-sectioned conveyor for receiving serial products from a supply conveyor, inspecting and rejecting out-of-tolerance products and adjustably conveying the products so as to establish a predetermined spacing therebetween, before transferring the products from supporting belts to the individual flights of a pusher member containing conveyor and from which the product flow is synchronized relative to an infeed conveyor to a wrapping station. The feeder comprises a microprocessor controlled, DC driven accumulation, transition and backlog conveyors, along with wrapper driven separation, transfer and infeed conveyors.

15 Claims, 22 Drawing Figures

POWER ON SWITCH SCAN LOOP

KEYBOARD / DISPLAY SWITCHES

*KEYBOARD / DISPLAY SWITCHES*

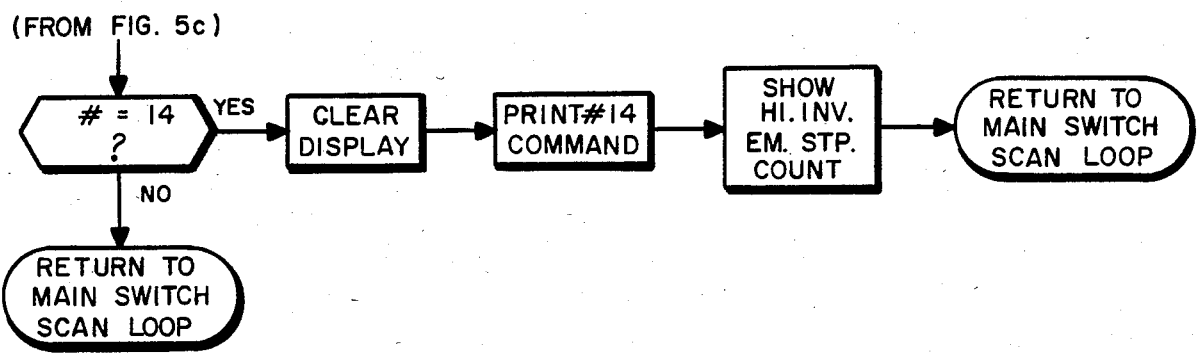
KEYBOARD / DISPLAY SWITCHES
*Fig. 5d*
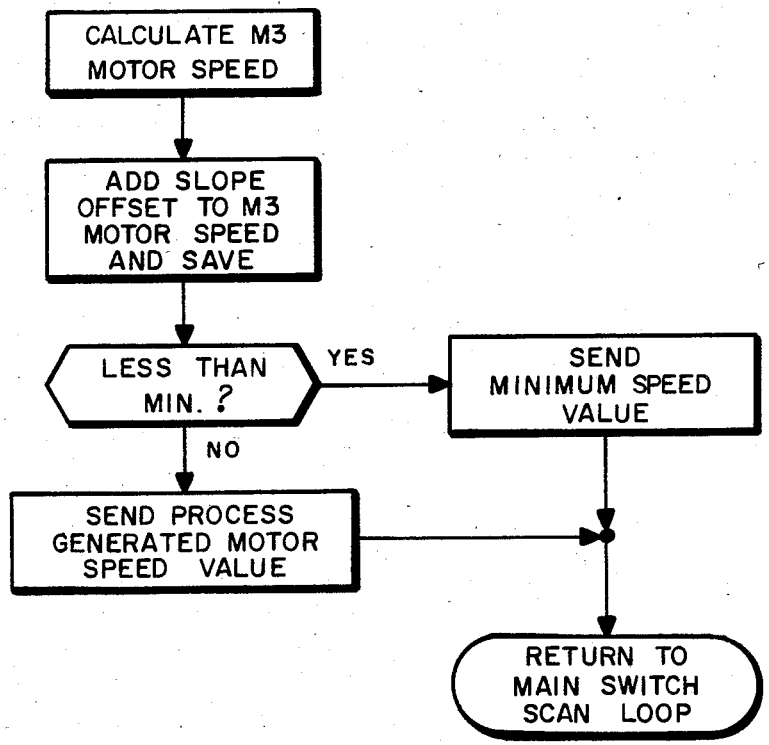
TRANSITION (M3T)
*Fig. 5ℓ*

NORMAL

SOURCE

* SEE FIG. 5g-2

SOURCE

STANDBY STOP

HIGH-SPEED MICROPROCESSOR-CONTROLLED BRANCH CONVEYOR

BACKGROUND OF THE INVENTION

The present invention relates to conveyor systems and, in particular, to a microprocessor-controlled, high-speed conveyor system which includes a plurality of independently controlled branch conveyors, each being coupled to an end-mounted wrapping station. Each branch conveyor is comprised of a controlled source and a feeder conveyor by means of which product is synchronously supplied to a variable-speed wrapping machine at a controlled rate dependent upon the availability of product.

In the manufacture and packaging of products, such as candy bars or bakery goods, it is a general requirement that a conveyor/wrapping system be employed that is compatible with the relatively high output rate of the production equipment. Also, because the production equipment is generally capable of producing product at rates greater than can be accommodated by a single wrapping station, it is typically necessary to have a number of branch conveyor/wrapping machine configurations which cooperate to advantageously handle the expected product flow rates with the least cost and floor space.

High-speed wrapping machines, such as the SUPER-H wrapper manufactured by Doboy Packaging Machinery, Inc. of New Richmond, Wis., allow certain commodities to be wrapped at rates in the range of 400 to 650 products per minute, depending upon the product length. Thus, if the output of a given piece of production equipment is, for example, 1,600 pieces per minute, plural wrapping machines and product conveyors must be integrated into the system to accommodate the higher production rates. Further, the number of wrapping machines employed depends not only on the rate of the production equipment, but also upon the conveyor system, its configuration and its speed of operation.

Branch conveyor systems currently on the market, however, are somewhat deficient in that they are not capable of supplying product at rates compatible with state-of-the-art wrapping machines. Therefore, it is oftentimes necessary to slow the wrapping machines down and not take full advantage of their speed. Also, because branch conveyor systems currently available are not capable of inspecting and rejecting product which is not within specification in terms of size or weight, it can happen that product which does not fall within such specifications is nevertheless wrapped. Prior-art branch conveyors also are not able to readily adjust to random product flow patterns and, as a result, product may arrive at the infeed section of the wrapping machines in an asynchronous fashion. Furthermore, prior art branch conveyor systems are operated under the control of the wrapping machine, independent of product availability. Such an operating condition is deemed to be less efficient than when product availability is also taken into account. It, therefore, has become apparent that it is desirable to have a branch conveyor system that can overcome these and other shortcomings of the prior-art systems so as to more optimally convey product to the wrapping machines.

The present invention comprises a product packaging system having a plurality of branch conveyors and associated wrapping machines, each wrapping machine being supplied sequentially by both a central supply conveyor and a uniquely controlled, laterally-displaced branch source conveyor and branch feeder conveyor combination. The plural branch source and branch feeder conveyors used in the system act in parallel with one another to divert product from the supply conveyor to its associated wrapping machine. In particular, each branch source conveyor operates independently of the others to supply product to be wrapped to its associated wrapping machine as product becomes available from the supply conveyor. If product is not available on the supply conveyor, the affected branch source conveyor and wrapping machine turn off. Each wrapping machine is thereby made the "slave" of its branch source and branch feeder conveyors, and its wrapping speed is varied to accommodate the inventory of available product. Thus, the individual wrapping machines disposed along the supply conveyor operate at varying rates dependent upon product availability.

Each branch conveyor in the system also acts under the control of a microprocessor control system in a unique fashion to inspect and reject product not falling with preprogrammed specifications and to adjust the spacing between products to match that of the infeed conveyor which is a part of the wrapping machine itself. In accordance with the present invention, the branch conveyors are each comprised of a plurality of belted conveyor sections which are mounted in an end-to-end fashion between the supply conveyor and a wrapping machine. Product, e.g., candy bars, is diverted from the supply conveyor to each laterally extending branch, and the first section of the branch, termed the branch source conveyor, receives the product, a row at a time, in a side-to-side orientation transverse to the direction of product flow. The spacing between adjacent rows is controlled by controlling the branch source conveyor speed by means of a microprocessor in a manner which is dependent upon product availability from the supply conveyor. As the individual products traverse the branch source conveyor, they are reoriented into a serial, end-to-end orientation before being redirected 90°, via a corner conveyor, to a microprocessor controlled, multisectioned branch feeder conveyor.

At the first section of the branch feeder conveyor, the products are caused to pass at a programmed speed past one or more photoelectric transmitter/receiver inspection stations, where each product is inspected to determine if it meets a plurality of preprogrammed specification parameters. Products not falling within the specification are diverted from the product flow stream by a device responsive to the output from the inspection apparatus.

The products meeting spec next pass to a speed-controlled transition conveyor and then to a controlled backlog conveyor. The speeds of these last-mentioned conveyors are controllably adjusted so as to transport products to downstream conveyor sections with a spacing only approximately corresponding to the spacing of the pusher fingers on the flights of the transfer conveyor of the wrapping machine. The speed of the wrapping machine, in turn, is controlled relative to the availability or inventory of product along the branch feeder conveyor.

Upon leaving the backlog conveyor, the products are transferred to a separation conveyor (shaft-driven from the wrapping machine) where the products are separated from one another a predetermined distance substantially equal to the transfer flight spacing. The products are further positionally corrected at a correction conveyor by determining each product's positional error relative to the center of the transfer flights. Thereafter, a speed-correction signal is produced for each product relative to a preprogrammed base speed ratio (determined during the initial set-up and depending upon the preprogrammed product parameters) so as to control the speed of the correction conveyor and thereby correct the position of each product relative to the transfer flights before transferring the product to a further belted transfer conveyor.

At the belted transfer conveyor, which is also shaft-driven from the wrapping machine, the manner of conveyance of each product changes from a belt-supported condition to a pushed condition, via a plurality of spaced pusher fingers which are attached to a laterally-displaced endless chain. The flights of the chain drive between adjacent fingers, in turn, are set to overlap the flights of the pusher fingers of the wrapping machine's infeed conveyor, and thus each product is synchronously deposited within one of the flights of the infeed chain conveyor without damage to the product.

The present microprocessor control system thus controls each branch source conveyor so as to supply products with a controlled spacing between rows, as determined by the adjustment of the source conveyor's speed, to each branch as it becomes available from the supply conveyor. The sections of each branch feeder conveyor are, in turn, controlled to monitor and reject out-of-tolerance product to correctly position the product relative to the spacing between pusher fingers on the infeed conveyor of the wrapping machine.

SUMMARY OF THE INVENTION

The present invention comprises a packaging system having a plurality of microprocessor-controlled branch conveyors supplied with product to be packaged from a centrally disposed supply conveyor and for transporting the product to a plurality of laterally displaced wrapping machines.

Each branch conveyor is comprised of a source-conveyor, a corner-conveyor and a multi-sectioned high-speed, branch feeder-conveyor for supplying product in an end-to-end fashion in synchronism with the infeed flights of an associated end-mounted wrapping machine. In operation, rows of product are periodically diverted from the supply conveyor to the various branches. Product is supplied to each branch conveyor as it becomes available at the diverter station for that branch only if a previously diverted row of product is clear of the diverter. That is, a row of product is swept onto the supply-conveyor and stored thereon while a diverter waits for a previous row of product to clear that diverter. Any products which cannot be received by an occupied diverter pass along the supply conveyor to a downstream unoccupied diverter station. Each branch source-conveyor's speed is adjustably controlled relative to the waiting and swept row so as to maintain a predetermined spacing between successive rows of product entered on the branch source-conveyor. Upon being diverted, the transversely aligned products are realigned in a serial, head-to-tail fashion and redirected to an associated branch feeder conveyor.

Each branch feeder-conveyor is comprised of a plurality of microprocessor-controlled, belted conveyor sections. In sequential order, they may be referred to as the "accumulation conveyor", the "transition" conveyor, the "backlog" conveyor, the "separation" conveyor, the "correction" conveyor, and the "transfer" conveyor. From this series of conveyors, product is synchronously supplied to the pusher fingers affixed to an endless chain comprising the infeed conveyor of the wrapping machine. The speeds of the accumulation, transition, backlog and correction conveyor sections are microprocessor controlled relative to a plurality of preprogrammed parameters and/or the speed of the wrapping machine so as to cause a controlled transfer of each product to the infeed of the wrapping machine. The remaining separation and transfer conveyor sections are mechanically, shaft-connected to the wrapping machine and thus operate at the speed of the latter. The speed of the wrapping machine is further controlled relative to the inventory level of product on the branch feeder-conveyor. Each product is also inspected relative to preprogrammed parameters and product not within specification are sidetracked and not supplied to the wrapping machine.

The operation of the present apparatus and the above objects, advantages and features thereof as well as various others may become more apparent upon a reading of the following description and an examination of the accompanying drawings. It is to be recognized, however, that the present invention is described only with respect to its presently preferred embodiment and, therefore, various modifications and alternative embodiments may suggest themselves to those of skill in the art. It is accordingly contemplated that the present invention shall be interpreted so as to include all such equivalent embodiments.

DESCRIPTION OF THE PREFERRED EMBODIMENT

Figure 1:
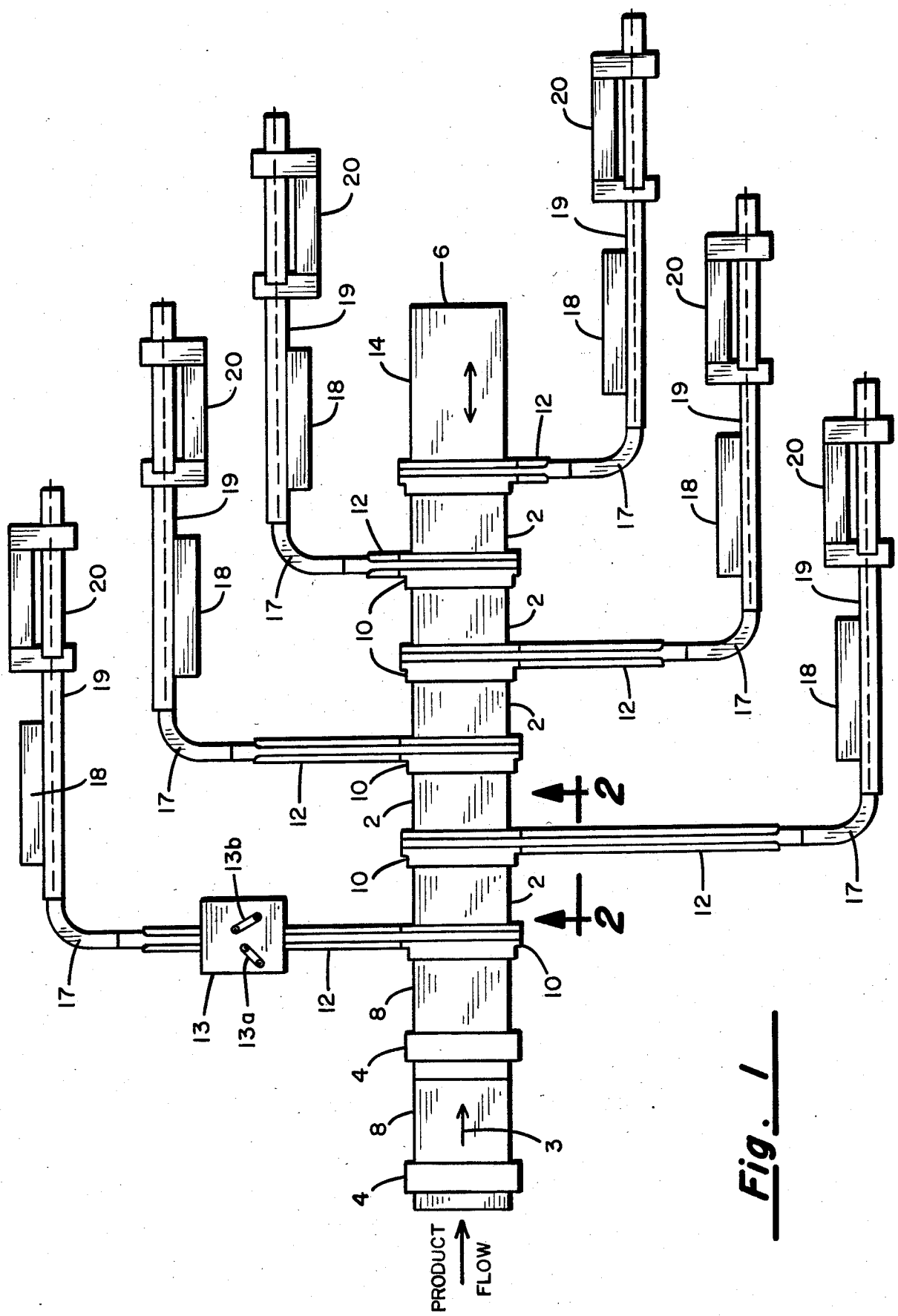
FIG. 1 shows a schematic block diagram of the system of the present invention.

Referring first to FIG. 1, a block diagram is shown of a packaging system that includes a plurality of microprocessor-controlled branch source and feeder conveyors. Specifically, the system shown is comprised of a centrally disposed supply conveyor 2 in the form of one or more motor-driven endless belts that is supplied with product from the output of a product producing machine (not shown), such as a machine for producing candy bars, bakery goods or the like. The product is deposited across the width of the supply conveyor 2 at the leftmost end in FIG. 1 in transversely extending rows. Each row is commonly referred to as a "slug".

As each row or slug begins to traverse the supply conveyor 2 in the direction of the arrow 3, the rows of product are repeatedly aligned in transverse rows by a pair of alignment bar assemblies 4. Because the slugs are deposited on the supply conveyor 2 with the products oftentimes being misaligned relative to each other, the assemblies 4 act to controllably rotate a number of overhead bars into abutment with the conveyor 2. Each row of moving product thus successively encounters a pair of bars as it moves along and the product within the row is individually delayed at each bar until it is aligned. Thereafter, the bar is raised and the aligned product continues it journey. An acceleration conveyor 8 mounted between each alignment assembly 4, in turn, acts to rapidly advance the rows of aligned product along the supply conveyor 2 so as to provide an adequate separation between slugs sufficient to ensure that each slug deposited on the supply conveyor 2 is laterally diverted onto a branch before reaching the end 6 of the supply conveyor 2.

In this regard, mounted at spaced points along the length of the supply conveyor 2 are a plurality of diverter means 10 that are selectively actuatable to controllably remove product from the supply conveyor 2 and to redirect the slugs of product laterally in a serial, side-to-side fashion along a selected one of the branch source-conveyors 12 that are transversely disposed relative to the supply conveyor 2. A branch source conveyor 12 is arranged to be supplied with slugs from the supply conveyor 2 when its associated diverter 10 is enabled to sweep accumulated product from a storage shelf in the diverter 10, upon the detection of a "product-clear" condition relative to the previously diverted row of product on that particular branch source conveyor 12. A type of diverter 10 useable in the system of the present invention may be a pneumatically-actuable conveyor surface which can be selectively tilted to permit the raising and transfer of product to a storage shelf located adjacent to the source conveyor 12, when the diverter's conveyor surface is titled upward. Thereafter, the slugs of product deposited on the diverter shelf are swept therefrom onto the source conveyor 12 by means of an overlying pusher member. Otherwise, the tiltable portion of the diverter 10 remains lowered and the successive rows of product are conveyed to the next downstream free diverter 10. On the off-chance that one or more rows of product are not diverted to a branch supply-conveyor 12 prior to passing the last diverter 10 employed in the system, they are transferred to an end-mounted and intermittently-driven storage conveyor 14, where the products collect and can be removed by an operator or, alternatively, can be redirected back to an upstream diverter 10.

Assuming that a given diverter is free to act upon a slug, the slug is first deposited onto the storage shelf of that particular diverter 10. Once the previous slug being processed at that diverter 10 has been moved clear of the storage shelf, the waiting row is deposited onto the associated branch source-conveyor 12. The new row is then conveyed, via the DC motor-driven source-conveyor 12, with the product in a spaced-apart, side-to-side orientation. In accordance with the preferred embodiment, the branch source-conveyor 12 is driven by means of a DC motor M1 (FIG. 4), and its speed is controlled by the system's microprocessor control system (MCS) relative to the availability of product from the supply conveyor 2 at the storage shelf of the diverter 10. With no limitation intended, the motor M1 for each branch source conveyor 12 may typically have a maximum operating speed of 1,750 rpm, and each is mechanically coupled to its associated conveyor belt so as to be able to move the rows of product at approximately 1.02 inches for each revolution of the motor shaft.

The actual speed of each branch source-conveyor 12 is, however, controlled by the MCS relative to the pulsed output of an incremental position encoder (See E8 in FIG. 4) mounted to each source-conveyor 12. This encoder produces a pulsed output that permits the MCS to monitor the position of each slug to a resolution of 0.107 inches per pulse. In particular, the speed of each branch source-conveyor 12 is adjusted relative to the presence of a new row of product on the associated diverter storage shelf so as to permit the previously diverted row to clear the storage shelf, before the waiting row is deposited onto the conveyor 12. Thus, a desired product spacing between slugs, consistent with the spacing between products within a slug, is achieved as is the synchronization of the branch source-conveyor 12 to the product flow on the source-conveyor 2. The speed of each branch source-conveyor 12 is thus continuously and independently adjusted, depending upon product availability. The details of the spacing on synchronization apparatus and circuitry will, however, be described hereinafter.

After traversing the branch source-conveyor 12, the product may be deposited on a separately arranged, fixed-spaced conveyor 13 that contains a pair of overlying belt-driven assemblies 13a and 13b. The assemblies 13a and 13b are positioned so that each product exiting the branch source first engages the assembly 13a whose belt is driven at a speed which is faster than that of the conveyor 13. As a result, each product is made to follow the belt of assembly 13a such that it is turned and conveyed to the assembly 13b. There, the reorientation of the alignment of each product is completed such that the products leaving the assembly 13b have been rotated 90°. That is, each product is now oriented in an end-to-end, serial relation to the others.

With continued reference to FIG. 1, upon leaving the fixed-speed and product alignment conveyor 13, the end-to-end oriented products are next received at a fixed-speed corner conveyor 17. Here, the product flow direction is redirected 90° so as to run parallel to the supply conveyor 2. In passing, it is to be noted that while the presently preferred embodiment contemplates separate fixed-speed conveyors 13 and 17 and turning assemblies 13a and 13b, alternatively, in some circumstances, a suitable turntable device may be employed in lieu thereof to achieve the reorientation of each product and redirecting of the product flow.

At the discharge end of each corner conveyor 17 is a branch feeder conveyor 18. Upon reaching this conveyor, the products are next successively transported by a plurality of controlled conveyor sections to the wrapping machine 20. While these conveyor sections are not individually identified in FIG. 1, they will now be discussed as to their general operation and the detailed description of their operation will be left to the discussion of FIG. 4. The first portion of each branch feeder-conveyor 18 is an accumulation conveyor section. It acts under MCS control to convey the product in end-to-end orientation past individual inspection and rejection stations at a fixed speed (dependent upon a plurality of preprogrammed operating parameters) towards an end-mounted wrapping machine 20. If a product, upon inspection, does not meet a predetermined and specified size (i.e., length and width), the relative position of that product is noted and it is rejected as it passes a downstream rejection station. Specifically, solenoid-actuated air nozzles blow the product off the side edge of the conveyor belt into a collection hopper.

Figure 4:
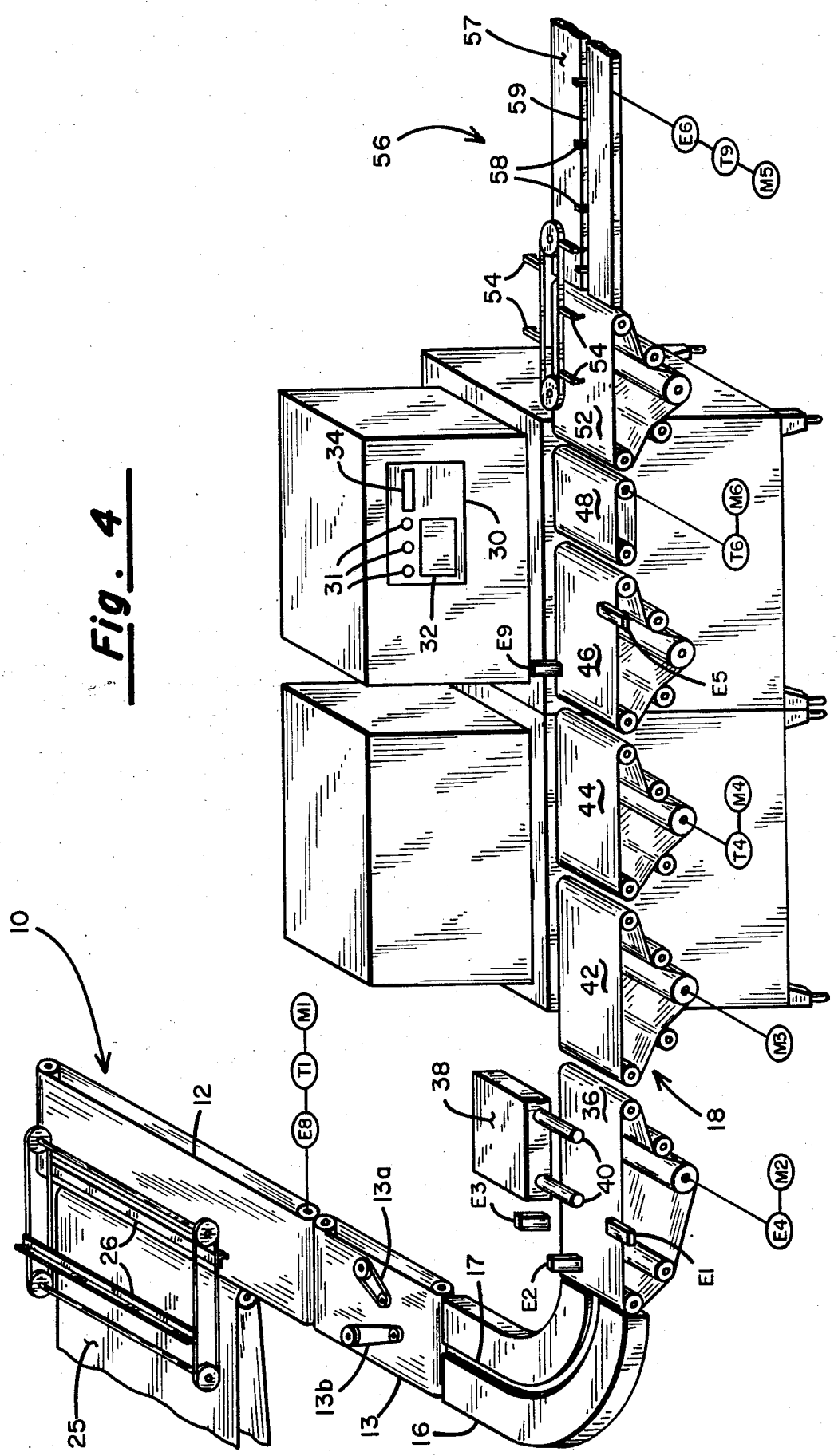
FIG. 4 shows a block diagram perspective view of one branch conveyor of the present high-speed packaging system.

With reference to FIG. 4, the accumulation conveyor 36 is driven at its fixed speed by a separately controlled DC motor M2 having a SCR motor controller associated with it. By way of example, the motor M2 may typically have a maximum speed of 1,750 rpm and may be coupled to the accumulation conveyor belt so as to permit a conveyor belt movement of, typically, 3.819 inches for each revolution of the motor M2. The belt speed and movement are further monitorable to a resolution of 0.024 inches per pulse via an incremental position encoder E4 that is appropriately mounted to the accumulation conveyor and which facilitates the MCS's inspection/rejection activities.

Upon leaving the accumulation conveyor, the product is next deposited on a transition conveyor 42 section. The transition conveyor section, like the accumulation conveyor, is driven with a separate DC motor M3 controlled by a SCR motor controller. Motor M3 may have a maximum speed of 1,750 rpm. Its speed, however, is proportionally controlled relative to the wrapping machine 20 so as to maintain a "backlog" condition on the next downstream conveyor section with a minimum of slippage or pressure between products. The "backlog" condition is the one in which each product actually physically touches the ones in front of and behind it.

Mounted forward of the transition conveyor section is the backlog conveyor section 44. It may also be driven by a suitable DC pulse width modulated (pwm) motor M4 which is feedback coupled to the wrapper by the MCS. The speed of the backlog conveyor is thus controlled by the MCS relative to the wrapping machine 20 so as to maintain a "backlog" condition while transferring product at a speed that generally synchronizes the products with the midpoints of the flights of the transfer conveyor.

From the backlog conveyor the products are next conveyed to a separation conveyor section 46 that is shaft-coupled to the wrapping machine 20. It acts to pull a predetermined gap between adjacent products. The size of the gap is determined by a predetermined drive ratio relating to the length of the transfer flights of the transfer conveyor. From the separation conveyor the products are then individually transferred to a correction conveyor section 48 that is coupled to a DC motor M6 and which is controlled, via a pulse width modulated (pwm) motor controller, that is, feedback coupled to the drive of the wrapping machine 20 via the MCS. There, each product is incrementally spacially corrected relative to an allowable positional error with respect to the midpoints between pusher fingers defining the flights of the transfer conveyor by proportionally varying the speed of the correction conveyor.

As each product leaves the correction conveyor section, each is picked up by the pusher fingers 54 of a side chain transfer conveyor 55. The side chain conveyor is drive-shaft coupled to the wrapping machine 20 and the pushers 54 thereon are arranged to resolve synchronously with those of the infeed conveyor of the wrapping machine 20. Upon leaving the side chain or transfer conveyor, the products are thus synchronously received by the flights of the wrapping machine infeed conveyor 56. This infeed conveyor may comprise an endless chain mounted below the surface 57 of the conveyor, there being plural spaced-apart pusher fingers 58 attached to the chain and projecting upward through a slit 59 in that surface.

From the above general description of the preferred embodiment, it should be apparent that each branch feeder conveyor 18 acts to receive and controllably position and synchronize the transfer of the products to their associated wrapping machine 20 as they become available from the supply conveyor 2. More of the details thereof will become apparent upon reference to the following description with respect to FIGS. 2, 3 and 4.

Figure 2:
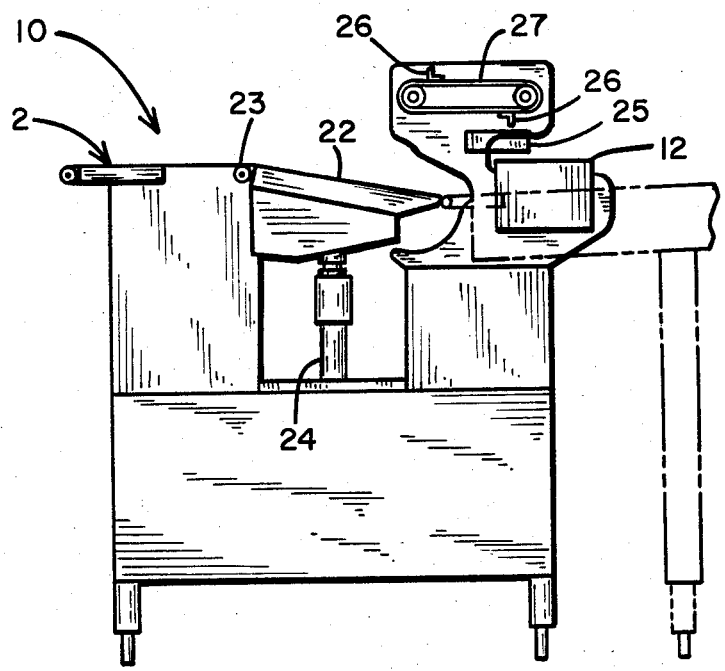
FIG. 2 shows an elevation view of a tilting-type diverter.

Referring now to FIG. 2, there is shown a partial elevation view of one type of diverter that can be used with the supply conveyor 2 for effecting transfer of product from the supply conveyor to a branch. In particular, the diverter of FIG. 2 contains a tiltable bed 22 that is pneumatically actuable via a lower lying pneumatically-controlled cylinder 24 so as to permit the tiltable bed 22 to be raised or lowered relative to a hinge 23 and thereby deposit rows of product either on the overlying storage shelf 25 or to continue down the supply conveyor 2. From the storage shelf 25, the rows are removed with the aid of an overlying sweep assembly 27 that contains a plurality of chain-mounted, intermittently-driven, sweep bars 26 and which act to transfer product to an associated branch source conveyor 12. The operation of each branch source conveyor 12 in the overall system is, in turn, controlled by the MCS and depends upon the position of each previously swept product slug with respect to the shelf 25.

Figure 3:
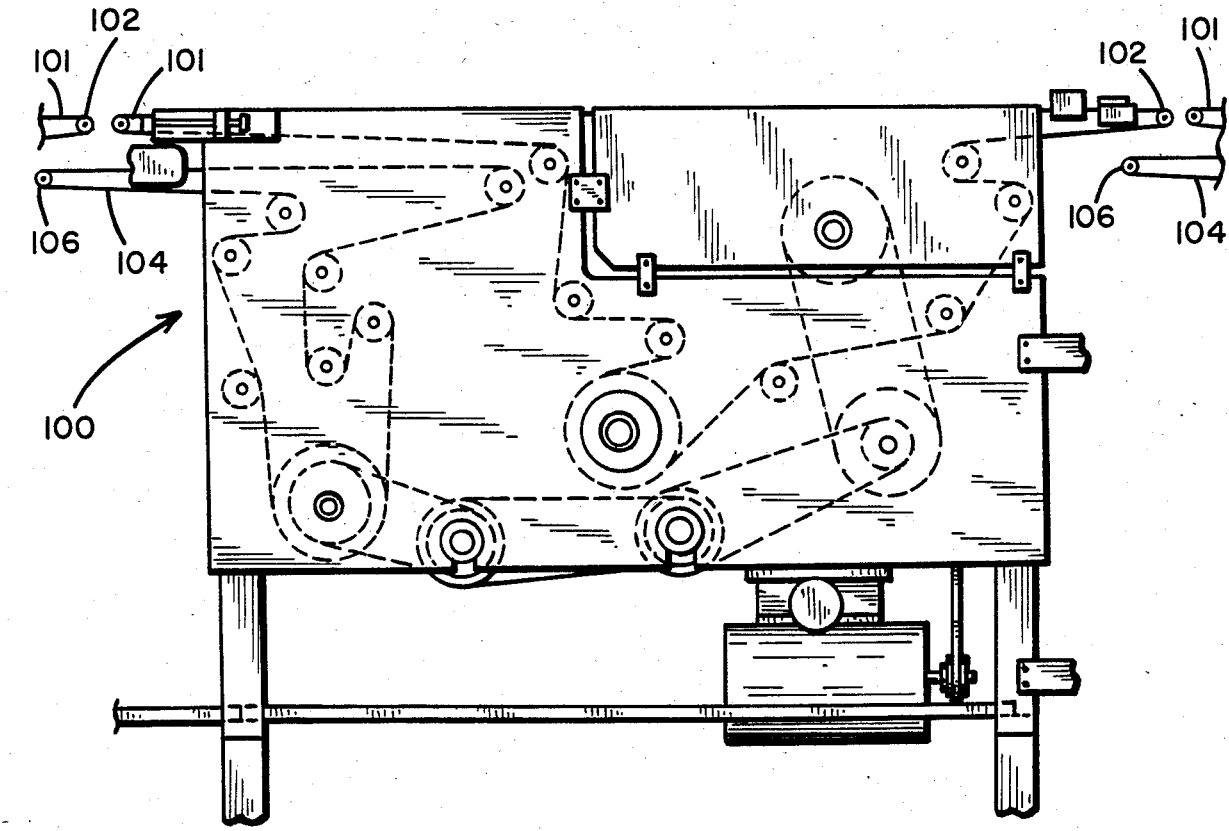
FIG. 3 shows an elevation view of a transpositer-type diverter.

Still another type of diverter 10 that may be used with the supply conveyor 2 is shown in FIG. 3. In particular, the diverter of FIG. 3 comprises a dual transpositor 100 of the type disclosed in the present assignee's co-pending application Ser. No. 539,951, entitled "MULTIPLE TRANSPOSITOR CONVEYOR SYSTEM", filed Oct. 7, 1983. While the details of the dual transpositor 100 can be learned upon reference to that application, it generally is comprised of a primary conveyor belt 101 that is mounted upon a retractable nose bar 102 and below which a secondary, indexably-driven conveyor belt 104 also having a retractable nose bar 106, is mounted. In operation, the secondary conveyor 104 of each dual transpositor 100 is mounted above one of the branch source conveyors 12. Rows of product passing along the primary conveyor belts 101 of a number of end-to-end mounted dual transpositors 100 are thus dropped onto selected secondary conveyors 104 by retracting one of the primary conveyor nose bars 106 and letting the product fall onto the secondary or lower lying storage conveyor 104. From there, and depending upon the condition of the branch source conveyor 12, the product is controllably dropped relative to a previous row, all as is more particularly described in the aforereferenced application.

Referring now again to FIG. 4, a schematic mechanical diagram is shown in partial perspective of one of the branch feeder conveyors 18 and its associated branch source conveyor 12, relative to a portion of a diverter 10 or a dual transpositor 100. Attention is also directed to Table I below wherein a plurality of preprogrammed product-related parameters are set forth which may be entered into the memory of the MCS by an operator during set-up and used by the MCS during operation. These parameters are principally related to the length of each individual product, the number of products in a slug and the length of a typical slug. The parameter, "MAX.SPEED", is the maximum allowed speed for normal running of the system such that the speed of the individual parallel paths can be balanced. These parameters are entered into the MCS via the control panel 30 and, in particular, the keyboard 32. As each is entered, its value is displayed in a scrolled fashion on the display 34 so as to confirm to the operator the value being entered. Upon entering all of the required parameters, the operator, via the keyboard 32, causes the MCS to perform a set-up algorithm wherein an initial speed is determined for each of the source conveyors 12 and for the various sections of the various branch feeder conveyors 18 that are not shaft-coupled to the wrapping machine 20. I

TABLE I
PREPROGRAMMED PARAMETERS

| Function | Data | Scaler |
| --- | --- | --- |
| Nominal product length | X.XX | Inches |
| Max. product length | X.XX | Inches |
| Min. product length | X.XX | Inches |
| Max. Speed | XXX | PPM |
| Slug size | XXX | Products |
| Run-out speed | XXX | PPM |
| Slug length | XX.XX | Inches |

Upon completing its set-up calculations, the system is ready to begin operating, which is initiated by the operator's depression of the Start button (not shown). The source conveyor 12 is then started at a speed dependent upon the programmed max. speed, slug length and slug size. Subsequently, the speed for each is controllably adjusted by the MCS relative to the availability of product at the associated diverter 10 or dual transpositor 100. In particular, the MCS acts to speed up or slow down each branch source conveyor 12, depending upon the presence or absence of product at the storage shelf 25 of diverter 10 or the secondary conveyor 104 of the associated dual transpositor 100 relative to the calculated midpoint for the programmed slug size and length. Assuming, therefore, that a first slug has been swept from one of the dual transpositors 100 and onto its associated source conveyor 12, the description of the operation will follow the travel of a slug through the branch source and feed conveyors of FIG. 4.

Once a slug has been swept onto the branch source conveyor 12 from the supply conveyor 2, a MCS generated "Sweep" command indicating this condition causes the MCS to monitor the encoder pulses from the position encoder E8 coupled to the branch source conveyor 12. While counting these pulses and determining the position of the slug on the source conveyor to a predetermined resolution, the MCS checks to determine whether or not another slug is present at the secondary conveyor 104. If a slug is not present when the MCS has determined that the midpoint of the slug on the source conveyor has been reached, it means that the source conveyor 12 is moving faster than the supply conveyor 2 can supply it and the MCS then acts to incrementally decelerate the motor M1, thus slowing down the rate of movement of the previous slug. If the presence of another slug is not sensed by the photoelectric transmitter/receiver mounted on the secondary conveyor 104 of the transpositor before the end of the slug then on the source conveyor 12 has been reached, the source conveyor 12 will stop. That conveyor is capable of stopping within one-half of a slug length for slugs of ten or more products. While the MCS is functioning to decelerate the source conveyor 12, when a slug is detected at the secondary conveyor 104 of the transpositor 100, the MCS freezes the speed of the source conveyor 12 at the value which it is running when the next successive slug is detected. Once the end of the slug on the source conveyor 12 is reached, the MCS initiates a sweep signal and causes the products waiting at the secondary conveyor 104 to be deposited onto the source conveyor 12 in a spaced relation to the previous slug. As mentioned, this space correlates with the same spacing that exists between individual products.

As the second slug progresses along the source conveyor 12, its midpoint is also monitored by the MCS relative to the presence of a new slug of products at the secondary conveyor 104. If products reach the storage shelf before the midpoint of the slug then on the source conveyor 12 is reached, the MCS causes the source conveyor 12 to be incrementally accelerated from the previous frozen speed until such time as the midpoint of the second slug is reached. At that point, the speed of the source conveyor is again frozen and, upon reaching the end of the second slug, the MCS causes the waiting slug to be deposited onto the source conveyor 12. In a similar fashion, for each successive slug of products arriving from the supply conveyor 2, the MCS accelerates or decelerates the speed of the source conveyor 12 relative to the midpoint and end point of the preprogrammed slug length.

The MCS thus modulates the speed of the source conveyor 12 to accommodate the availability of product from the supply conveyor 2. If gaps occur on the supply conveyor 2, the source conveyor 12 stops and waits for its associated dual transpositor 100 to receive a new slug of product before starting up. This standby condition is indicated to the operator by means of a yellow flashing beacon (not shown) located near the control panel 30 only if the gap is sufficiently large that the feeder and wrapper dispose of product such that the minimum backlog is reached. It should be noted, too, that while the above description contemplates a slug of more than ten products (e.g., candy bars), for less than ten products, the MCS is not able to decelerate the source conveyor 12 to a stop in one-half of the programmed slug length. Instead, it takes two cycles to come to a stop. In particular, the MCS decelerates and freezes the speed of the source conveyor 12 at a first speed for the first cycle, and then causes it to stop during the next cycle if a new slug is still not present at the dual transpositor 100. In this instance, a larger gap will thus exist between the first and the next succeeding slug that starts the source conveyor 12.

The above-described type of control is radically different from that typically encountered in prior art conveyor systems. In typical prior-art schemes, the branch conveyors are controlled primarily by the end-mounted wrapping machine 20 and not, as in the present system, by the availability of product from the supply conveyor 2. The present control system is deemed to be preferable in that once normal operating speeds are achieved, it tends to smooth out the product flow to the wrapping machines 20 and is more tolerant of gaps encountered in the product flow on the supply conveyor 2.

Upon leaving the source conveyor 12, the products are moved onto transfer conveyor 13 and the associated turning assemblies 13a and 13b (FIG. 1). There each product is realigned from a side-to-side orientation to an end-to-end orientation and moved to the corner conveyor 17. Because conveyors 13 and 17 only reorient the products, they are each driven at a fixed speed calculated along with the base speed ratio for the nominal product length and maximum product rate.

Once the products have been reoriented end-to-end, they are transferred to the branch feeder conveyor 18 where they first enter the accumulation conveyor section 36. Suitably mounted at the front of the accumulation conveyor 36 are a number of photoelectric transmitter/receivers E1, E2 and E3 for sensing each product relative to the preprogrammed specifications or parameters of Table I which define acceptable products. In conjunction with the transmitter/receivers E1, E2, and E3, each product's position on the accumulation conveyor 36 is also monitored using a position encoder E4 that is suitably operatively coupled to the conveyor 36. In particular, the encoder E4 acts to produce a plurality of pulses per each 360° of its rotation of the conveyor drive roll. For example, each pulse of the encoder E4 may approximate 0.024 inches of conveyor travel. Thus, a relatively high degree of accuracy is maintained by the MCS as to each product's position on the belt 36. During the inspection of each product, the MCS, upon sensing the presence of the leading edge of each product at the sensor E1, begins to count the pulses of the encoder E4 and continues counting until the trailing edge of each product is sensed at the sensor E1. The MCS then compares the accumulated count for each product to the preprogrammed values of Table I indicative of the maximum and minimum lengths within which each product must fall. If a detected product's count does not fall within this preprogrammed range, a reject signal is stored and the MCS continues to monitor that product's position until the product reaches the rejection station 38. There, the out-of-specification products are rejected, all as will be described in detail hereinafter. Suffice it to say for now, that in the preferred embodiment, software is provided in the MCS for simultaneously monitoring the position of eight products on each of the accumulation conveyors 36 employed in the system. Depending upon the application, however, more or less products may be monitored as necessary.

While the transmitter/receiver E1 acts to monitor product length, the transmitter/receiver E3 acts to monitor the width of each product. Specifically, as the pulses of the encoder E4 are counted and once the midpoint for the preprogrammed nominal product length is reached, the MCS looks to the output of the transmitter/receiver E3 to determine if a product is sensed. If no product is sensed, then a reject signal is stored, which is indicative of a product that is too narrow. Alternatively, if product is sensed, the product is allowed to pass as good product. At the same time, the transmitter/receiver E2 monitors the accumulation conveyor 36 to determine whether or not a product is misaligned or too wide. Thus, while the transmitter/receiver E3 may show good product, the transmitter/receiver E2 may show that the product is in fact misaligned or too wide and thus to be rejected.

As the products continue past the transmitter/receivers E1, E2 and E3 and if a reject signal was previously stored for a given product, as that product passes the reject station 38, the MCS activates solenoid-controlled air nozzles 40 to blow that product from the conveyor 36. The length of the air blast is proportional to the length of the rejected object. Good products, on the other hand, pass without interruption and are counted as good inventory. It should be noted, too, that if pieces of product or the like break off and fall on the accumulation conveyor 36, they are detected and rejected in the same fashion as unacceptable (out-of-spec) product.

Upon leaving the accumulation conveyor 36, each product is transferred to the transition conveyor 42 which is driven by DC motor M3. The transition conveyor 42 is initially driven at a speed determined by the MCS as a function of the nominal product parameters and slightly slower than the fixed speed of the accumulation conveyor 36, until a partial backlog condition occurs therealong. Thereafter, the MCS controllably applies drive signals to the transition conveyor 42 that are proportioned to the speed indicated at the wrapper tachometer T9. The transition conveyor moves at a speed which is always slightly faster than the backlog conveyor section 44. The speed of the transition conveyor 42 is, however, maintained to minimize the pressure between touching products so as to prevent them from adhering to one another.

The backlog conveyor section 44 is mounted downstream of the transition conveyor section 42. All products on this belt are conveyed in a backlogged condition, ie., touching head-to-tail contact with adjacent products. The speed of the backlog conveyor 44 is controlled via the MCS so as to grossly synchronize the backlogged products with the center of the pusher finger spaced flights of the transfer conveyor. This is achieved by means of the MCS's detection of the leading edge of each product at photoelectric transmitter/receiver E9 and the comparison of the then current position of position encoder E6 associated with the transfer conveyor driven from the wrapping machine 20 to a calculated midpoint position dependent upon the set-up parameters. Depending upon the magnitude of difference, the MCS proportionally accelerates or decelerates the motor M4 and thereby adjusts the speed of the backlog conveyor 44 to grossly align all backlogged products with the transfer flights.

The separation conveyor 46 next receives the products. It is shaft coupled to the wrapping machine 20 via a linking shaft (not shown) that acts to move the separation conveyor 46 a distance slightly less than the transfer flight length for each infeed flight of the wrapping machine 20. Because the separation conveyor 46 normally moves at a rate which is higher than that of the backlog conveyor 44, the products become separated from one another as they traverse the separation conveyor 46 and before they enter the correction conveyor section 48.

The correction conveyor section 48 forms the fifth conveyor section of the branch feeder conveyor 18 and, like the backlog conveyor 44, its DC motor M6 is tachometer feedback coupled via tachometer T6, pulse width modulated controller C6 and the MCS to the master tachometer T9 of the wrapping machine. Depending upon the programmed nominal product length, the correction conveyor speed is correctively adjusted for each product as it enters upon conveyor 48 so as to center each product relative to the space between adjacent pusher fingers on the transfer conveyor. Thus, the correction conveyor 48 is controlled by the MCS to more finely center the products relative to the transfer conveyor pusher fingers than can be achieved by merely controlling the backlog conveyor 44.

In operation, the photoelectric transmitter/receiver E5 overlying the separation conveyor 46 monitors the trailing edge of each product relative to the position encoder E4 that, in turn, monitors the individual flights of the transfer conveyor. The MCS then determines the error or difference from these inputs associated with each product and applies appropriate digital speed correction signals. In particular, the error is determined by comparing the count of the position encoder (E6) pulses at the time the product's trailing edge is sensed to a calculated desired count. Depending on the magnitude of error (i.e. ±180°), a positive or negative digital speed correction signal is selected from a read-only memory and algebraically added to the base speed ratio so as to change the speed of the correction conveyor 48 for a distance proportional to the length of the product before returning to the base speed ratio. The displacement error of the next product is then determined in the same fashion and the speed of motor M5 again changed for a similar period, if necessary. Thus, the correction conveyor 48 makes periodic speed changes as necessary to synchronize each product with the transfer conveyor flights, for whatever speed the wrapping machine 20 is operating. The correction factor is applied to the base speed only while the product is positioned in a predetermined region on the correction belt designated as the correction area. At other times, the correction conveyor moves at its base speed.

Once each product's position is properly corrected, the products are received at the last section of the branch feeder conveyor 18 which is the transfer conveyor 52. The transfer conveyor 52, like the separation conveyor 46, is shaft-driven from the wrapping machine 20, although the transfer conveyor 52 also includes a side-mounted, chain-driven assembly 53 having a number of pusher members 54. Once products are transferred to the transfer conveyor 52, they are initially conveyed via the supporting conveyor belt, until one of the laterally-displaced pusher members 54 rotates about its upstream sprocket wheel and engages the back of each product. Thereafter the products are pushed, rather than being belt conveyed, until they are transferred to the infeed flights of the wrapping machine 20. The wrapping machine infeed, however, forms a part of the wrapping machine 20 and is not considered as a part of the branch feeder conveyor 18. The various sections of the branch feeder conveyor 18 thus act to synchronize the flow of acceptable products to the infeed flights of the wrapping machine 20 so that they will not be damaged by the lugs of the infeed conveyor.

Associated with the MCS is a stored subroutine for controlling the speed of the wrapping machine as a function of the quantity of product on the branch conveyor 18. In particular, the MCS monitors the quantity of useable products (i.e., inventory) contained between the photoelectric transmitter/receiver E1 and the photoelectric transmitter/receiver E5. For each valid unrejected product, the MCS increments an inventory register when it detects the trailing edge of products at E1 and decrements the inventory register when it detects the trailing edge of products at E5. Depending upon the inventory condition of the branch feeder conveyor 18 at any time, the MCS then acts to increase or decrease the speed of the wrapping machine toward a corresponding speed value stored in a read-only memory. It does this by generating a plurality of incremental speed corrections used to increase or decrease the wrapping machine speed toward the stored speed indicated for that inventory. However, because the inventory condition is continuously changing, actual wrapping machine speed tends to drift between the stored limits. The speed, however, will not exceed the preprogrammed maximum speed entered during set-up for more than a few products and the wrapping machine speed will be zero (except during start up) for any value of inventory that is less than the minimum inventory value calculated by the MCS from the preprogrammed values.

Referring now to FIGS. 5a through 5i, a number of generalized flow diagrams are shown for various ones of the software modules or subroutines that are adapted to be executed by the microprocessor control system embodied in the present system.

Figure 5A:
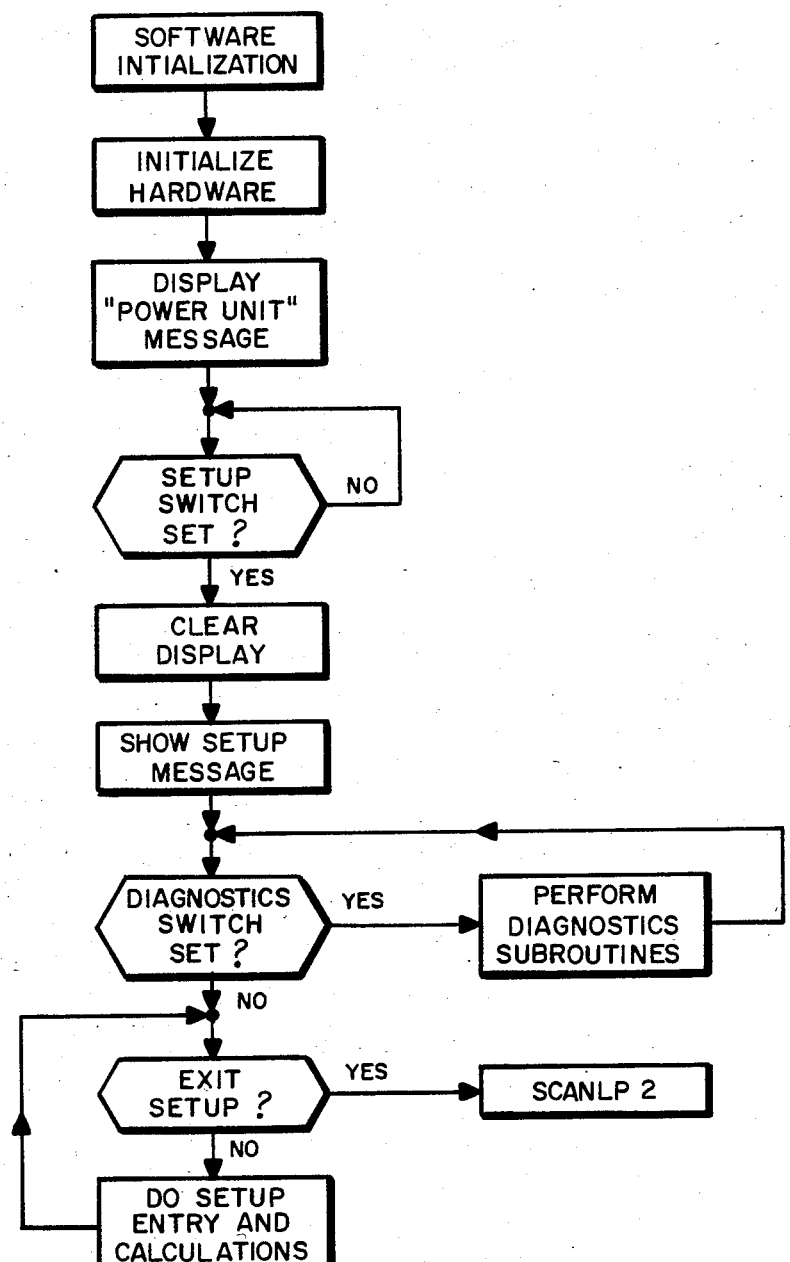
FIGS. 5a to 5q show generalized flow diagrams of the operation of the microprocessor controller.

POWER-ON SWITCH SCAN LOOP—FIG. 5(a)

In FIG. 5(a) the "Power-on Switch Scan Loop" is illustrated. The software conforming to this depicted flow chart, generally speaking, causes the MCS to become initialized. During this phase, certain motors are disabled, counters and registers are cleared and the software is readied for execution. A "Power Initiated" message is made to appear on the operator's control panel. Next, the condition of a Set-up Switch, which is a key-operated manual switch, is tested to determine whether it is on or off. If activated, the MCS performs the Set-up subroutine which, in effect, comprises still further initialization of the system. Specifically, during the Set-up subroutine, certain operator displays are cleared and a "SET-UP" message is presented as a prompt to the operator who then enters the various parameters such as product size, packages, etc.

Following that, the software tests the condition of the so-called "Diagnostic Switch", which is a switch available to the serviceman. If that switch had been set, the software branches to execute certain diagnostic subroutines, and a return causes the diagnostic mode to continue until such time as the Diagnostic Switch is reset. At that point, control shifts to the Set-up mode and the system goes into an Idle mode where it waits for the next operator-initiated action. If the "Exit Set-up?" test reveals that further operator-initiated inputs are required before the machine can be run, suitable prompts are presented to instruct the operator as to what set-up parameters, e.g., product length, wrapper speed, etc., are to be entered.

Figure 5B:
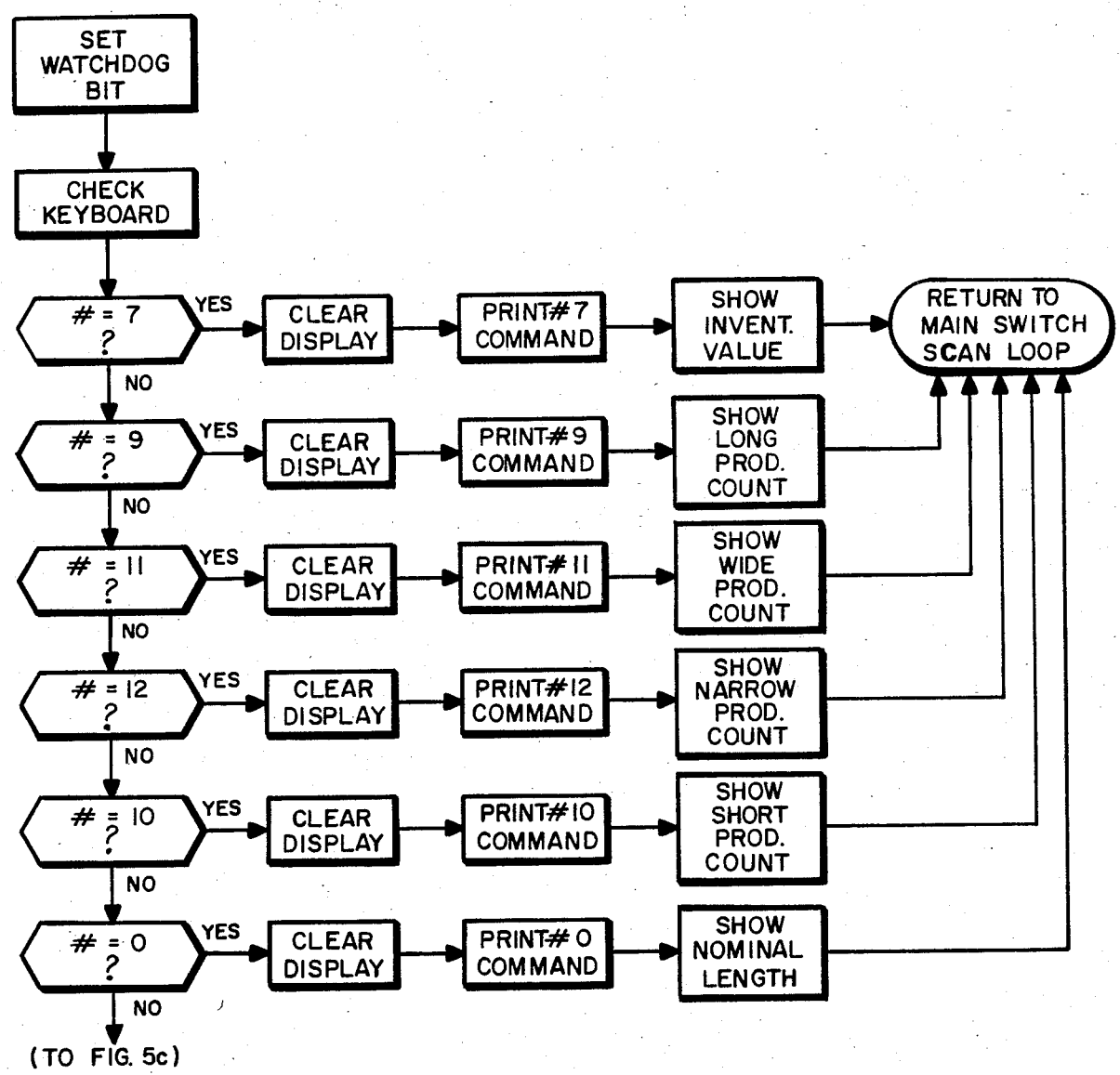
Figure 5C:
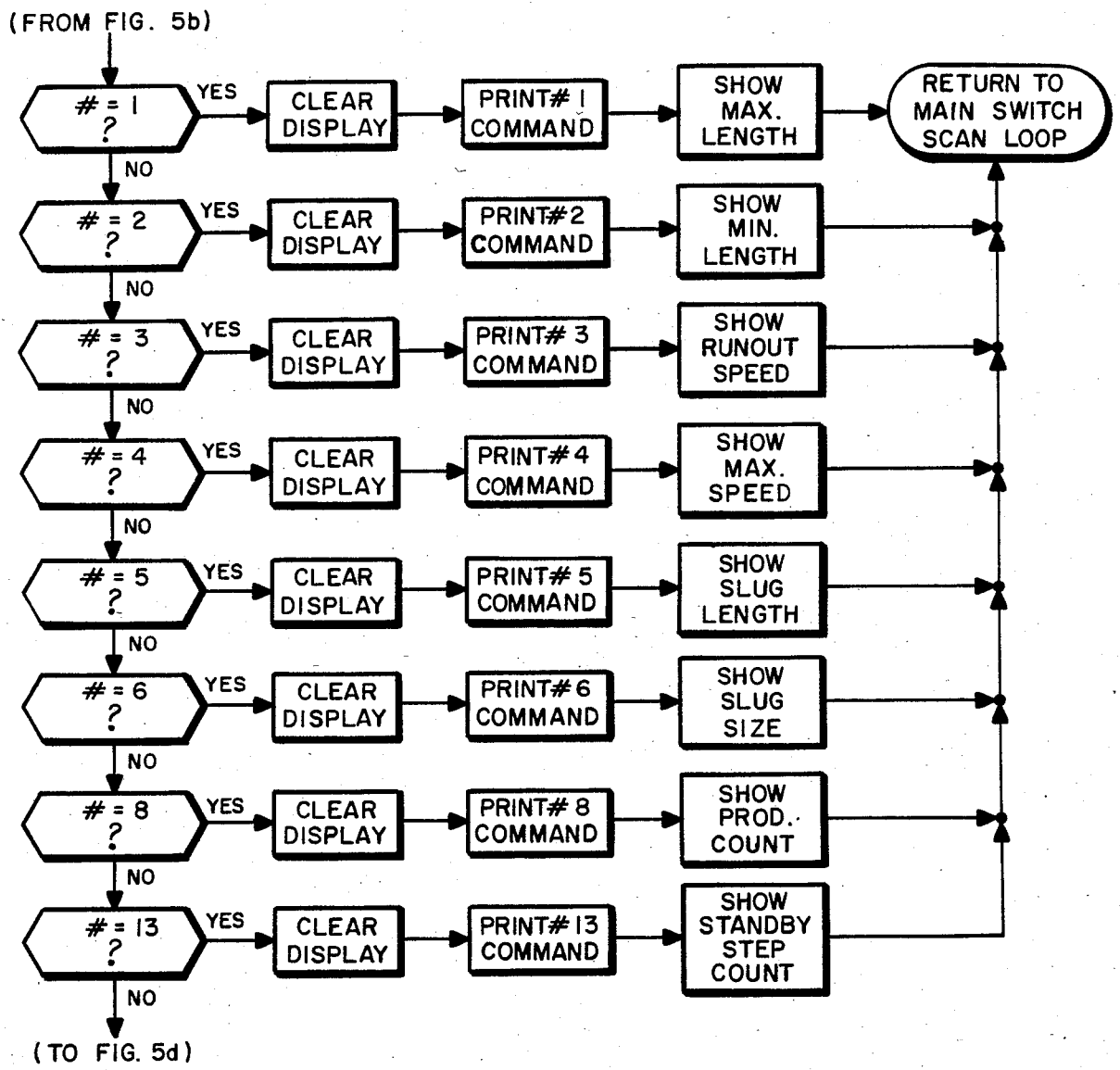

KEYBOARD/DISPLAY SWITCHES—FIGS. 5(b)-5(d)

Additional software is provided in the system whereby the operator control panel can be made to report on machine functioning when various operator-controlled pushbutton switches are actuated. The "Keyboard/Display" subroutine, when executed by the microprocessor, monitors each of a plurality of operator control buttons to determine which has been pressed to perform an appropriate subroutine whereby selected information is presented to the operator in human-readable form.

Following that, in sequence, a test is made to determine whether pushbutton #7 has been actuated. If so, a display area on the control panel is cleared and the value of the inventory at the time of the pushbutton actuation is presented. If pushbutton #7 had not been depressed by #9 had, again, the display area would be cleared and replaced with a number indicative of how many products have passed the inspection station which are out of specification because of being too long.

With the examples of switches #7 and #9 presented, the reader will immediately recognize how the software operates to inspect the condition of each of the remaining switches labeled #0 through #14 and how the respective messages are presented on the operator display panel. In each instance, following the activation and presentation of the appropriate parameter on the display panel, control returns to the Main Switch Scan Loop, which continues to monitor the various operator pushbuttons, waiting for one to be actuated. In that the switches are each scanned every eight milliseconds and because a human operator key entry requires, on the average, approximately 50 milliseconds or more, it is not possible for the human operator to depress a particular pushbutton and not have it sensed by the Keyboard/Display Scan software.

The various scans which may be displayed are set out in Table II below.

TABLE II

| DISPLAY COMMANDS | | |
|---|---|---|
| Function | Data | Scaler |
| Nominal product length | X.XX | Inches |
| Max. product length | X.XX | Inches |
| Min. product length | X.XX | Inches |
| Slug size | XX | Products |
| Run-out speed | XXX | PPM |
| Maximum speed | XXX | PPM |
| Slug length | XX.XX | Inches |
| Product count | XXXXXX | Products |
| Inventory value | XX | Products |
| Wrapper stand-by stop count | XXXXX | Units |
| Wrapper emergency/high inventory stop count | XXXXX | Units |
| Reject long count | XXXXX | Products |
| Reject short count | XXXXX | Products |
| Reject wide count | XXXXX | Products |
| Reject narrow count | XXXXX | Products |

The information in the data column indicates the numerical order of magnitude which can be presented on the LED display panel.

Figure 5E:
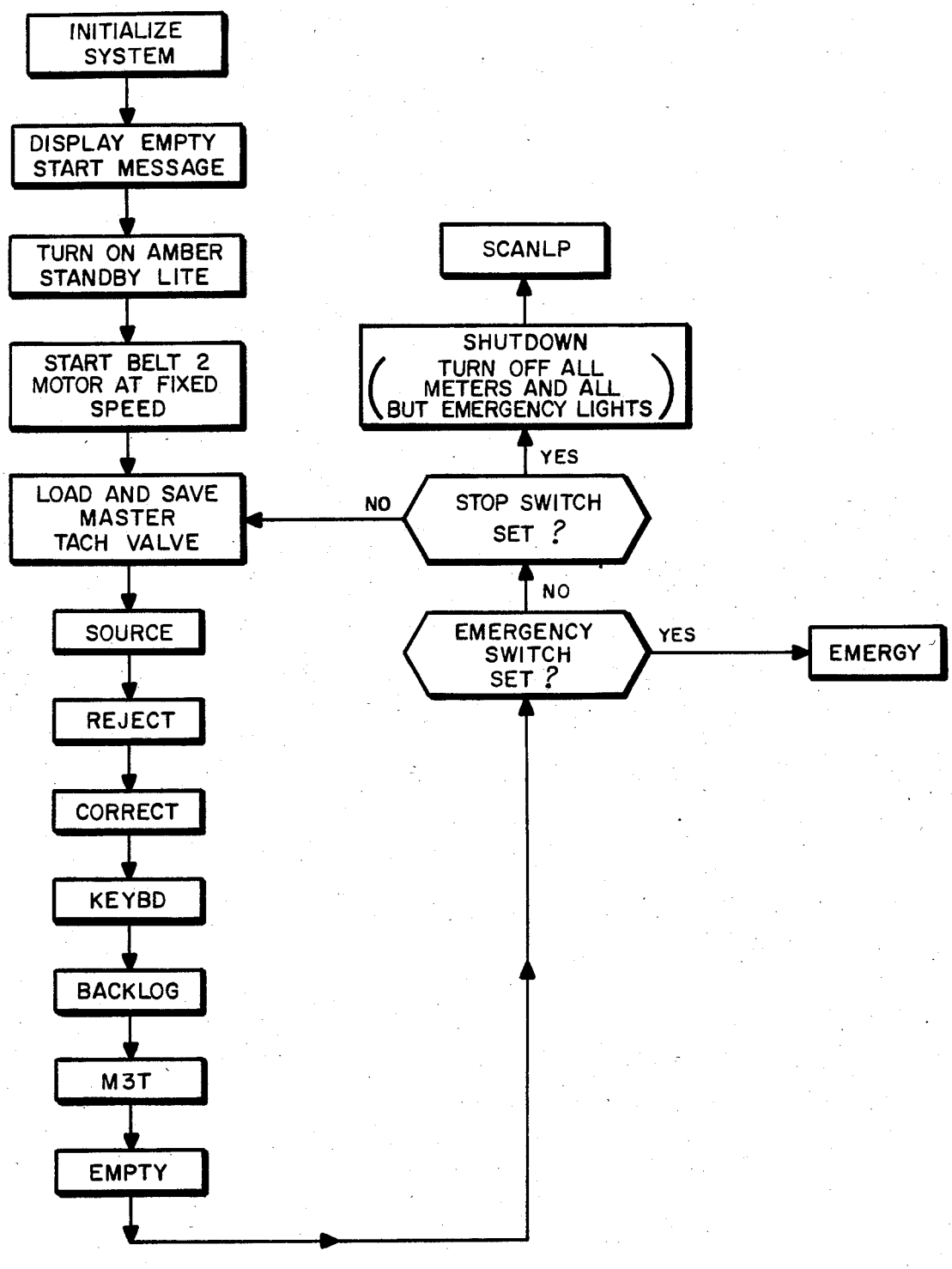

EMPTY START—FIG. 5(e)

The "Empty Start" routine is a subroutine which, again, might be considered as a series of software and hardware initalization operations. An Empty Start is defined as the situation where there is no product in the feeder itself. That is, the presence of product is not detected between the Inspection Station on the end of the input end of the feeder to the Correction Belt Product Position Sensing Eye at the output end of the feeder. With reference to the flow diagram, upon entry into the Empty Start phase, the backlog and correction belts are stopped as is the wrapper. The accumulator belt is started and made to run at a speed corresponding to the product of the maximum product rate and the sum of the product length and gap. The system then waits for product to arrive at the Inspection Station. Assuming that the products pass inspection as far as their size parameters are concerned, they are tallied in the Inventory Control software element and are considered to be a part of the inventory which is between the Inspection Station and the Product Sensing Eye located at the correction belt. When the first product to arrive travels down toward the backlog belt, the output from the encoder associated with the accumulator belt are counted and the numerical value in the counter is indicative of the product position. Thus, when that first product arrives at the backlog belt, the backlog belt motor is started. As such, the subsequent product following the first will close the gap between the products so that they assume the backlog condition where each product is touching the preceding one.

The software continues to monitor the inventories and when a predetermined count is reached, the wrapper motors are initiated and the wrapper is made to operate at a fixed, relatively low speed. The software continues to monitor the level of inventory and, when it reaches a point where there is more inventory in the high-speed feeder than the inventory which is equated to the minimum speed, commands are sent to the wrapper motors to cause them to run at an increased speed which is determined by the inventory level. Thus, if inventory level reaches a predetermined high value and remains there, the wrapper speed will also remain constant. However, if the inventory level should decrease, the wrapper speed is made to decrease accordingly.

Once the inventory reaches a point where it commands the wrapper to operate at a higher rate than the minimum speed originally presented to it, control shifts from the Empty Start mode to a Normal Run mode.

With continued reference to FIG. 5(e), it will also be observed that the Empty Start software includes an Emergency Switch and a Stop Switch. When the Stop Switch is actuated, the system shuts down in a manner in which synchronization is maintained of products disposed upon or downstream of the backlog belt.

Figure 5F:
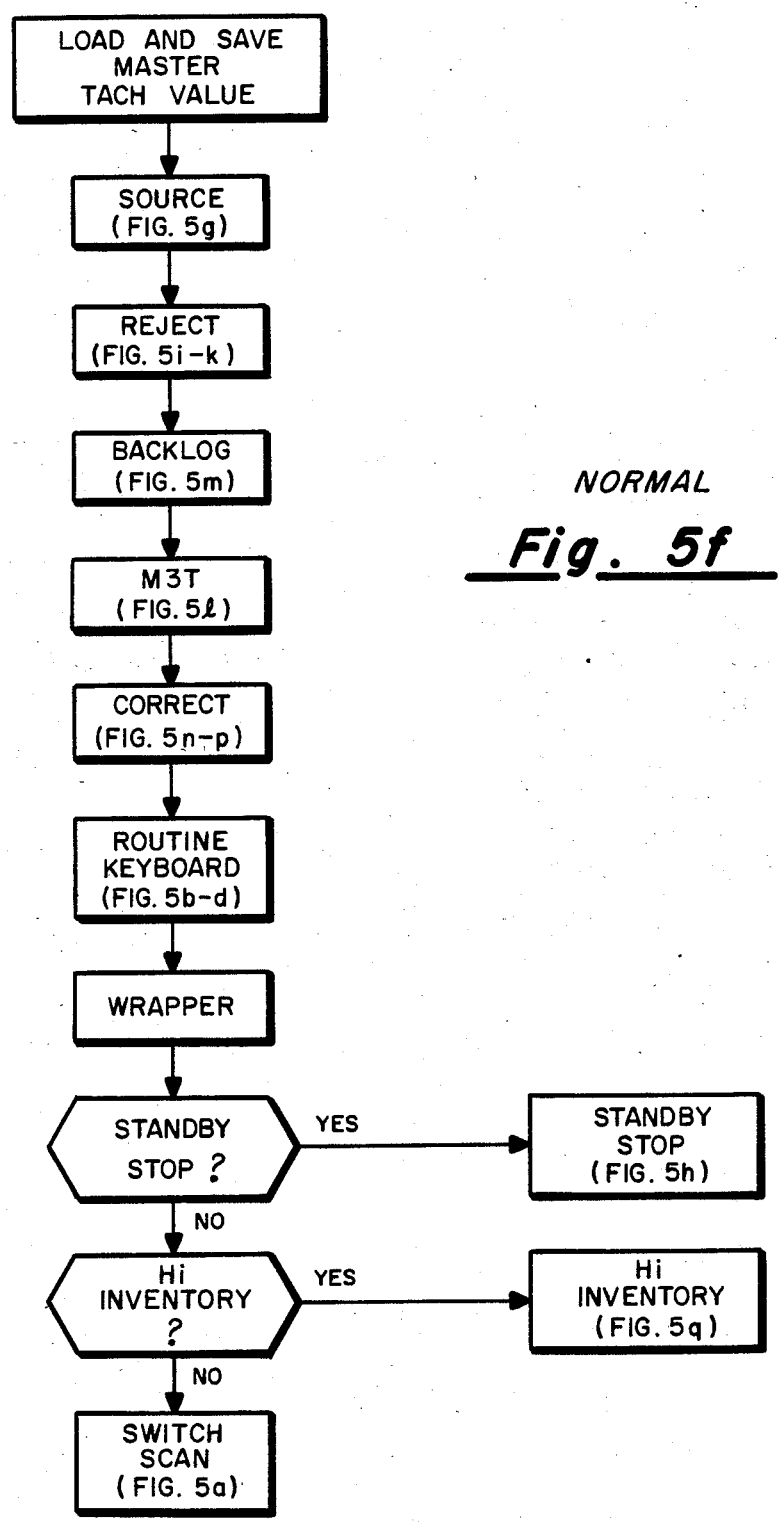

NORMAL RUN—FIG. 5(f)

The "Normal" flow diagram is somewhat similar to the Empty Start routine just described. It includes a series of routines referred to as "Source", "Reject", "Backlog", "M3T", and "Correct". The total operating loop time for executing the software associated with this flow diagram is eight milliseconds. Referring to FIG. 5(b), the control of the machine is effectively divided into eight major modules, each of which takes one millisecond to execute. If, for any reason, one of these modules does not execute within the alloted time, the so-called Watchdog Bit will not be reset and an error indication is then provided. As is suggested by the Normal flow diagram, once every eight milliseconds, the Master Tach, which is mechanically coupled to the wrapper, then controls the motors associated with the backlog belt and the correction belt, dictating how fast to go relative to the wrapper speed being monitored by the Master Tach. The designation "M3T" refers to the motor associated with the transition conveyor. Under "Normal" operation, if the inventory is below the minimum where the wrapper speed is being controlled as a function of inventory level, then the transition belt, controlled by motor M3, is made to run at a fixed speed that is slightly less than that of the accumulator belt. If, on the other hand, the system is running with more than minimum inventory, which is the Normal operating mode, then the transition conveyor is tracking the speed of the backlog belt, but with a slightly higher speed than that of the backlog belt. This tends to close any small gap between adjacent products.

With continued reference to the "Normal" flow diagram of FIG. 5(f), it can be seen that the flow diagram includes two stop modes. The first, termed "High Inventory Stop" comes into play when the level of inventory exceeds the capability of the high-speed feeder. This stop condition shuts down the machine and requires operator-intervention to get the system restarted. The second stop mode, "Standby Stop" comes into play if, for any reason, the inventory begins to deplete, and the high-speed wrapper begins to slow down and when a certain low level of inventory is attained, the wrapper will be functioning at its minimum. Now, if inventory level decreases still further, the system comes to a halt. However, as soon as product again appears, operation resumes independently of operator-intervention.

Figures 1, 5G:
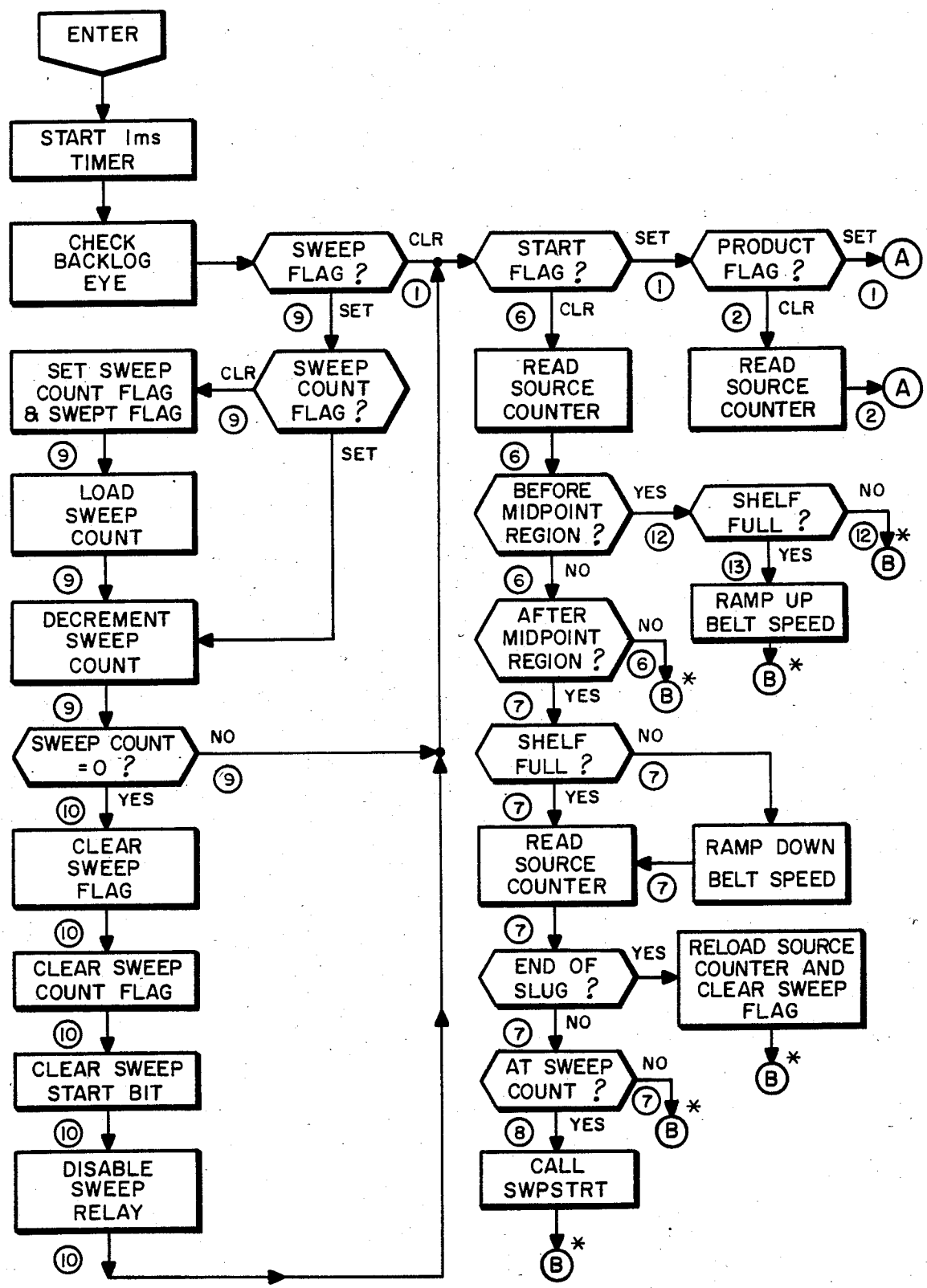
Figures 2, 5G:
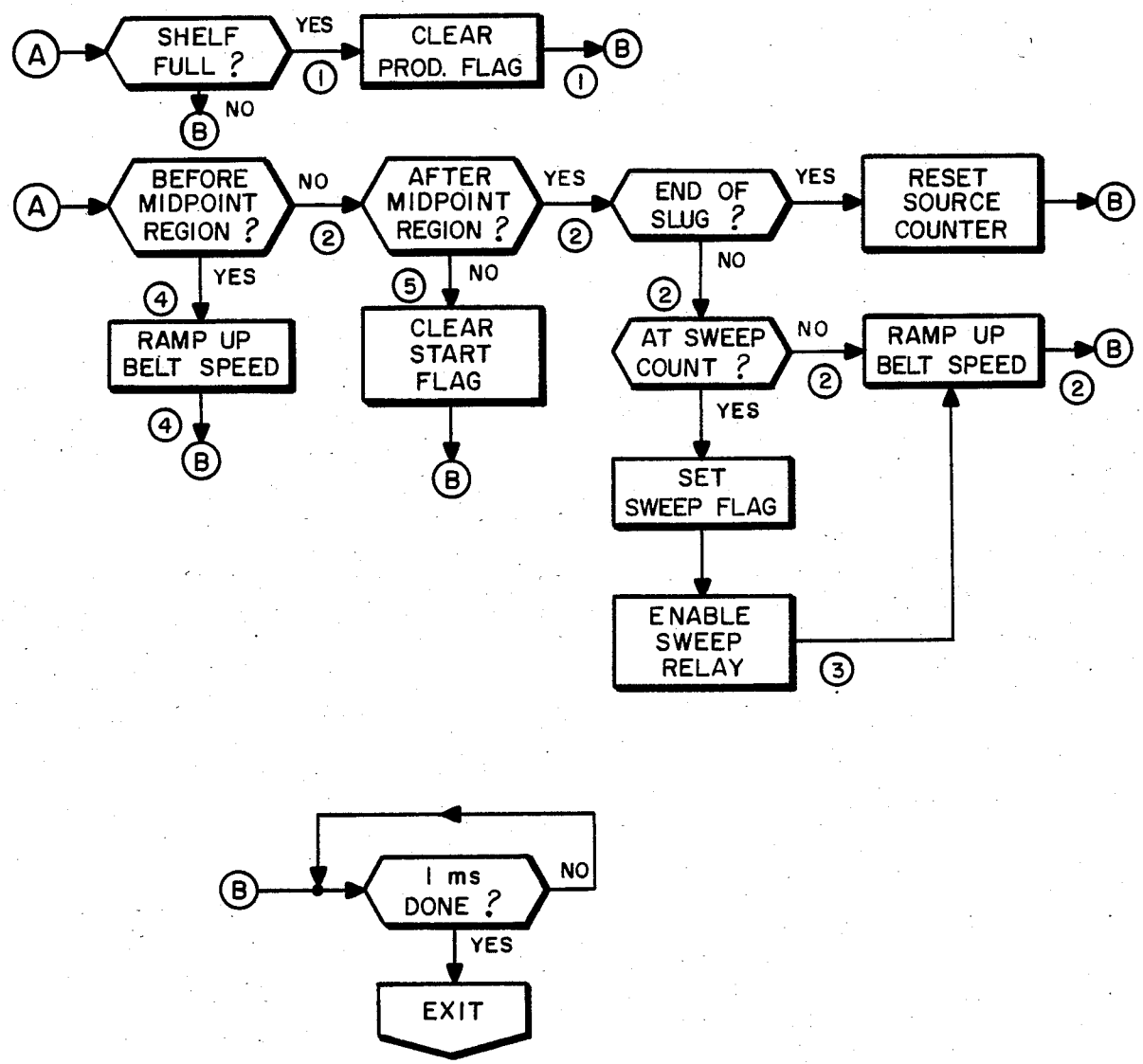
Figure 5H:
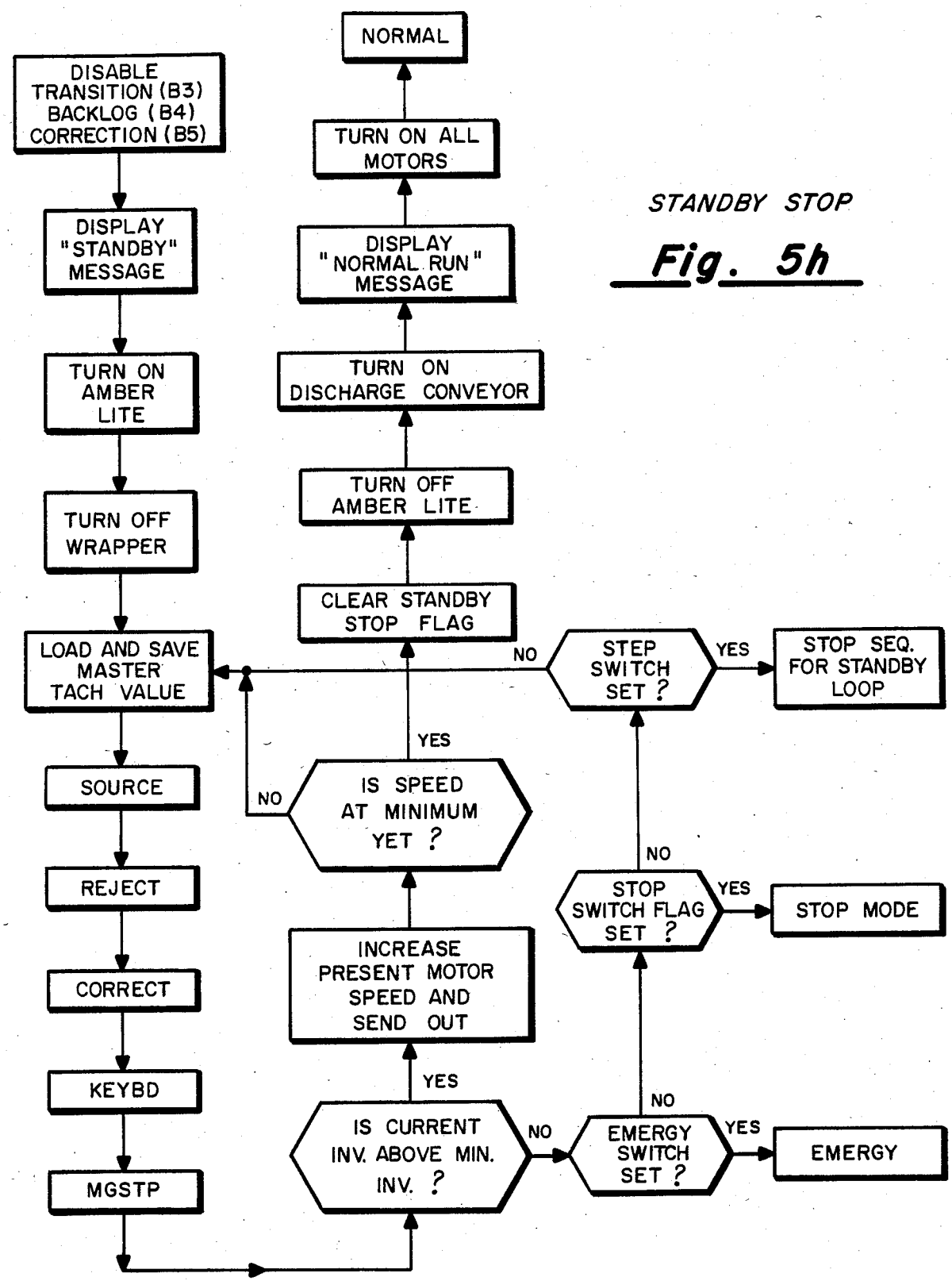

SOURCE ROUTINE—FIG. 5(g)

The flow diagram of FIG. 5(g) pertains to the control of the source conveyor 12. The "Source Control", when it detects a row of products, provides the necessary signals to position that row of products on the source conveyor. Once that row of products is on the source conveyor, it starts into motion, accelerates, and attempts to arrive at a speed that has been selected by the operator during the Set-up phase. It accelerates at a controlled rate so that if, for example, the wrapper is set to operate at its maximum speed, say 600 products per minute, then the acceleration profile is such that when one-half of a row of product has passed a reference point, maximum speed would have been reached.

When the midpoint of a row of product is established, the next subsequent row of products should be available on the supply shelf for sweeping unto the source conveyor. If the supply of product becomes available prior to the time that the midpoint of the previous row is where it should be, then it is known that the source conveyor is moving too slowly and a higher throughput could be obtained if the wrapper and its associated feeder conveyor is made to run at a higher speed. However, if the row of products becomes available to the source conveyor after the midpoint of the prior row, then it is known that the source conveyor has been running too fast. That is, the row of new product wasn't available at the moment that the midpoint of the prior row arrived at a predetermined location.

Speaking generally, then, the MCS and its associated photoelectric input devices and the encoder mechanisms are "watching" the product on a storage shelf and when the encoder indicates that a previous row swept onto the source conveyor has its midpoint at a particular known location and product is not yet available on the storage shelf, then the source belt is made to slow down at a controlled rate. If more products do not become available by the time that the second half of the row in question passes the predetermined spot, the conveyor will switch to the Standby stop mode. Where a subsequent row of product appears on the storage shelf following the passage of the midpoint of the preceding row, the conveyor speed will tend to freeze at the value existing at the time of arrival of that second row of product.

If it should happen that the rate is at that at which subsequent rows of product become available on the storage shelf relative to the midpoint of the preceding row on the source conveyor, then the following row of products will appear on the storage shelf at approximately the midpoint of the row then on the source conveyor since the speed of the source conveyor stays constant. If, however, for one reason or another, the arrival of available product does not coincide with the midpoint of the row then on the source conveyor reaching a prescribed location, the source conveyor will again accelerate or decelerate. Such a series of speed-ups and slow-downs ultimately cause the source conveyor to adapt to a speed which is equal to the rate of available rows of product, thereby smoothing out the product flow downstream of the source conveyor. It is thus the function of the "Source" control software to cause the system to operate smoothly at a speed which is equal to the rate of product row availability from the supply shelf.

With the foregoing general features of the control algorithm in mind and with reference to FIG. 5(g), it will be recalled that all of the function modules existing in the machine operate upon an eight millisecond repeat cycle. The control algorithm services all functions within the machine once every eight milliseconds. A one millisecond timer is initiated at the start of each software module and when all functions called for by that module have been completed, the system will wait for the one millisecond timer to expire before control passes to the next module. A number of the software routines employed in the overall control of the system of the present invention require information relating to the status of the backlog. As was mentioned earlier when the overall "Source" routine was generally described, a "Check Backlog Eye" operation is included in a number of the subroutines executed by the MCS. The photoelectric eye E9 in FIG. 4 is positioned so as to be able to discern the product location.

The Source routine includes a number of so-called flags, e.g., Sweep Flag, Sweep Count Flag, Start Flag, Swept Flag, etc. These symbolically represent software memory functions that serve to keep track of where the operations are when a particular software loop is completed in that the system does not always complete an entire task in eight iterations of the one millisecond timer. Hence, it is required that the operation cycle back through a sequence more than once and the flags provide means whereby a determination can be made as to whether the various sequences are only in progress or have been completed.

As was already mentioned, the machine operates on a series of eight millisecond cycles. Certain passes through various loops do not require a full eight milliseconds. Hence, means are provided to maintain this synchronization. Specifically, program operation may exit a particular loop through the flow diagram and enter the so-called SOREX subroutine. That is to say, each of the exit points from various flow paths through the Source flow diagram labeled with the exit symbol "B" enter the SOREX subroutine which merely insures that a one millisecond time period has elapsed before the next pass is made through any of the remaining loops and, in this fashion, synchronization is maintained.

It is the function of the source control software to keep track of the condition of the storage shelf, i.e., the presence of products available for a next sweep, and the location on the conveyor of the previous row of products. In the diagram of FIG. 5(g), the small circled numbers indicate the control paths followed by the software upon repeated passes through the control algorithm. For example, following the path identified by the symbol ① at start-up, the system is initialized such that the Start Flag will be set. The Product Flag will be set while all other flags are cleared. The belt is stopped with the motor enabled. Before the source belt will be activated, an electric eye associated with the shelf must indicate that it is full and that product will be available to be swept unto the source belt. Thus, upon entering the software loop, the one millisecond timer is initiated, the "Check Backlog Eye" routine is executed and because, under the assumed conditions, the Sweep Flag is in its cleared condition, the Start Flag is set and the Product Flag is set, a test is repeatedly made to determine whether the shelf is full. If not, this same flow path is repetitively followed until the shelf full condition is satisfied, at which time the Product Flag is cleared. Following that, the 1 ms delay (SOREX) is timed out and the flow path is re-entered.

Again, the one millisecond timer is initiated, the "Check Backlog Eye" routine is executed and the condition of the Sweep Flag and the Start Flag are such that a test will be made of the Product Flag. Because on the previous pass it was assumed that the Product Flag had been cleared, control now follows the path identified by the ② designations. Specifically, the source counter will be read and a determination is made whether the contents of the source counter indicate that the midpoint region of a previous row of products has been reached. If not, means must be provided for speeding up the source conveyor. This is accomplished in software by testing whether the source counter contents indicates the passage of the midpoint region of the previous row. If this count does not indicate that the end of the previous product slug has been reached, the next test is to determine whether the contents of the source counter equals the sweep count. If so, then the conveyor is operating at the proper speed so that the Sweep Flag can be set and the Sweep Relay actuated to cause the row of product on the shelf to be swept unto the source conveyor belt. However, if the contents of the source counter are not equal to the sweep count, then the speed of the source belt will be increased.

If the source counter contents are such that neither the "before midpoint region" nor the "after midpoint region" are indicated, then it is known that the position of a first product slug on the conveyor is just at the midpoint. When this condition prevails, the Start Flag will be cleared (see path ⑤)

Assuming that the previous path through the software routine resulted in a clearing of the Start Flag, the next succeeding path through the software control will follow the path labeled ⑥ out of the "Start Flag" decision diamond. The source counter will again be read and tests again made as to whether the slug on the source conveyor is before or is after the midpoint region. If it is assumed that it is after the midpoint region, the software control will follow path ⑦ and a test is again made to determine whether the shelf has product available on it for sweeping. If it does not at the time the midpoint region has passed, then it is known that the source belt is running too fast and should have its sped reduced.

Having run through the above examples, it is believed that persons skilled in the art reading this explanation and following the flow chart of FIG. 5(g) will be in a position to understand the overall control logic relating to the source conveyor. Furthermore, those skilled in the art would be in a position to write the particular program of instructions for implementing the logic defined by the flow chart. Hence, it is believed unnecessary to explain the further operations in greater detail or to provide the listings of instructions in machine language since those listings depend upon the particular microprocessor chip used to implement the MCS. It is apparent also that the purpose of the "Source" controller subroutine of FIG. 5(g) is to monitor and control the rate of delivery of product to the source conveyor 12 to that of the product arriving at the diverter shelf 22. Depending upon the filled condition of the shelf 22 and the relative position of a previous slug midpoint, the MCS acts to accelerate the source conveyor 12 if the shelf fills before the previous slug's midpoint is reached. Subsequently, the speed is ramped down if the shelf is empty or, the speed may be maintained until the next slug midpoint or the SHELF FULL signal initiates a correctional speed change. The speed of the source conveyor belt 12 may not, however, exceed a preprogrammed maximum speed. Also, as already was mentioned, if product does not arrive on the storage shelf before the sweep control times out, the source belt will be slowed to a stop. This is the function of the so-called "Standby Stop" routine shown in FIG. 5(h).

When the machine control indicates a Standby Stop, the transition belt (B3), the backlog belt (B4) and the correction belt (B5) are disabled or turned off and the message "STANDBY" is presented to the operator. An amber warning beacon on the control panel also glows. The wrapper itself is turned off. The various subroutines ("Source", "Reject", "Correct", "Keybd", and "Mgstp") are repeatedly executed until the test "Is Current Inventory Above Minimum Inventory?" indicates a "Yes" response. At that point, the various motors are again started and testing takes place until a determination is made that the belt speed has reached the minimum speed entered by the operator. Once that has taken place, the "Standby Stop" flag is cleared, the amber warning light is extinguished and the discharge conveyor is turned on. The "STANDBY" message on the display panel is now replaced with "NORMAL RUN" message and operation has been fully resumed.

Where it is determined that the current inventory is not above the minimum inventory, the stop conditions prevail with an emergency stop being effected if the "Emergency Switch" is set. Similarly, if the Emergency Switch is not set but the Stop Switch flag is set, the normal stop will take place upon a detection of low inventory.

Figure 5I:
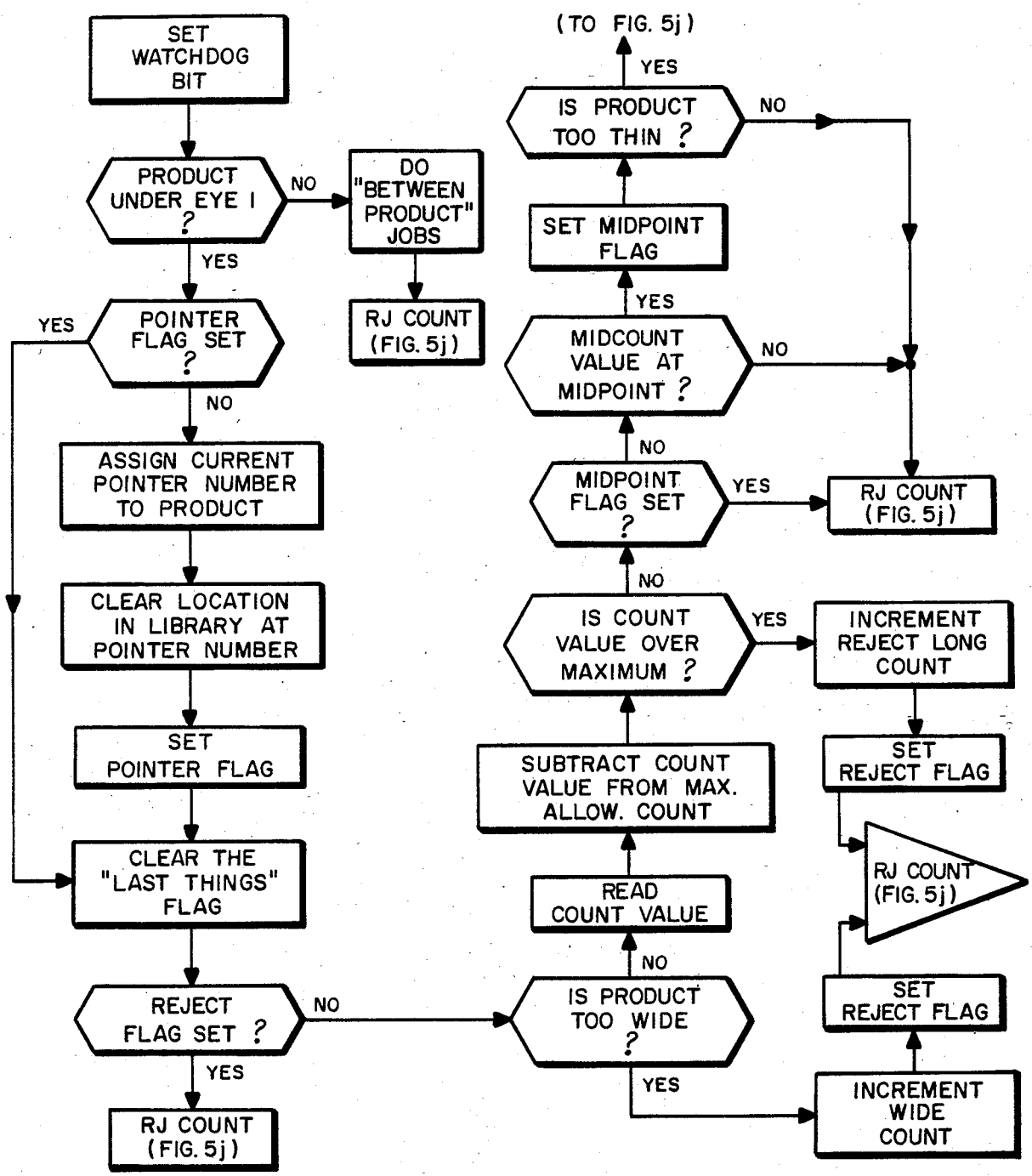
Figure 5J:
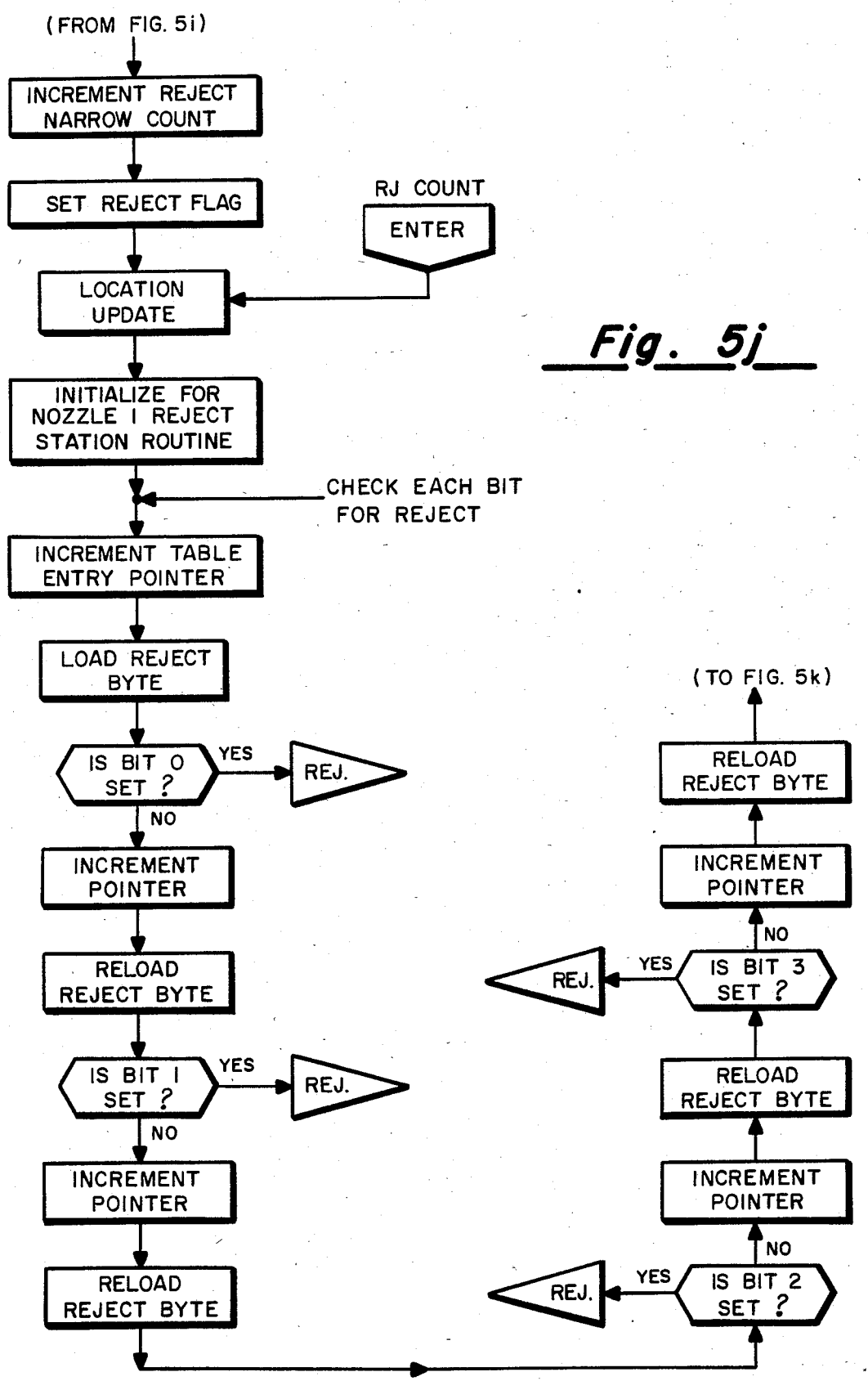
Figure 5K:
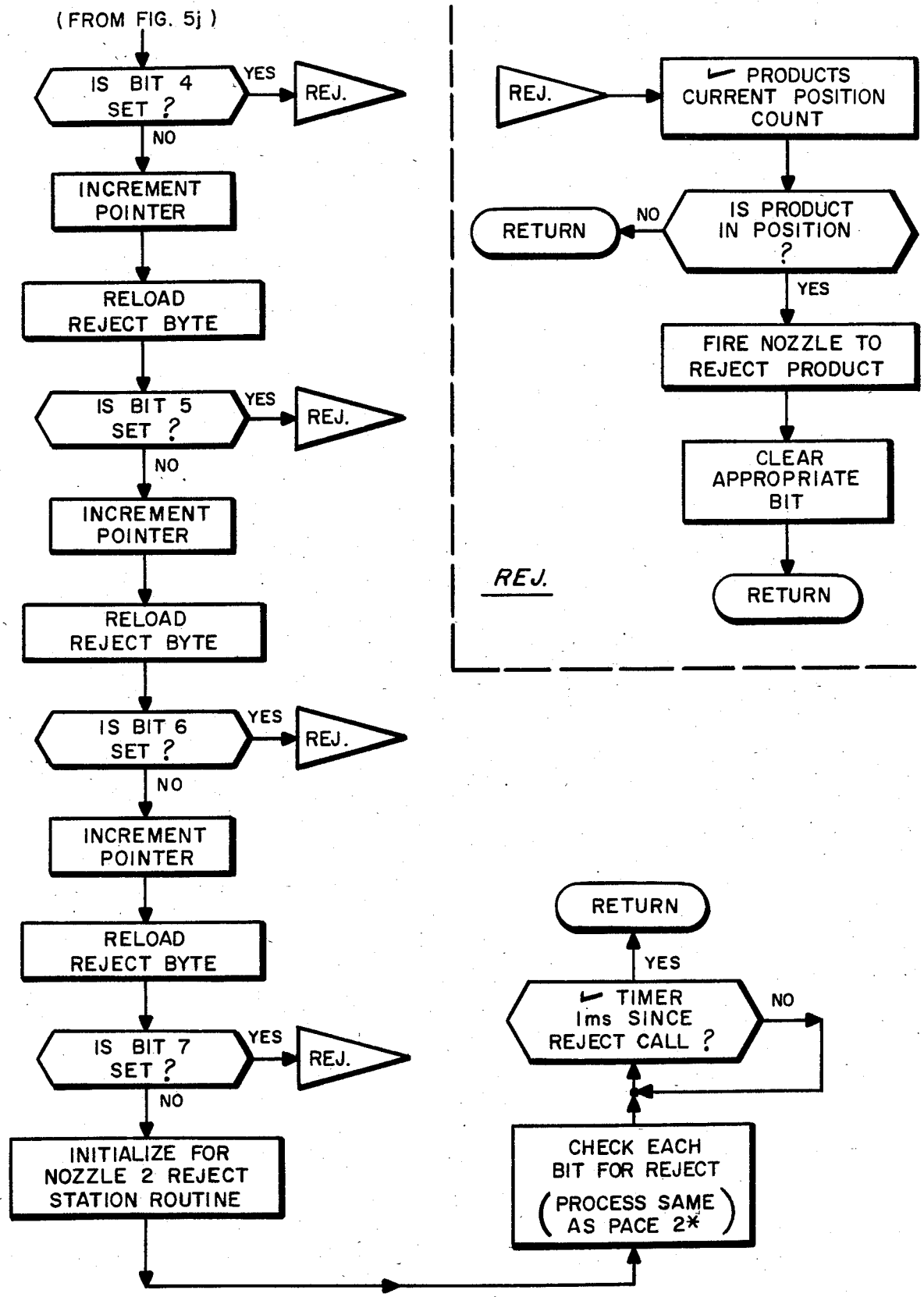

REJECT SUBROUTINE—FIG. 5(i) THROUGH 5(k)

As mentioned earlier in the specification, disposed proximate the accumulator belt are a series of photoelectric eyes E1, E2 and E3 used to determine whether a product is within predetermined size constraints. Further, the product's position on the accumulator conveyor 36 is monitored by an incremental encoder E4, which is coupled to the drive shaft of the accumulator belt and produces a series of pulses that correspond to conveyor motion. As reflected in the Reject flow diagram, it is the objective of the MCS to examine the product, determine whether it is wider than a predetermined width parameter or narrower than that parameter.

The third eye E3 in the cluster of photoelectric eyes positioned above the accumulator belt senses product length. While the eye is blocked by the presence of a product passing therebeneath, encoder pulses are accumulated and, hence, the count developed is proportional to the length of the product. That count is compared to the minimum length and maximum length parameters which were operator-entered during the Set-up mode. Assuming that the product is of the appropriate length and that its width falls beneath the "too wide" and "too narrow", it is considered acceptable and becomes a part of the inventory.

It the product falls outside of the predetermined dimensional parameters, it is necessary to keep track of that particular product in that it is examined at the accumulator belt but rejected downstream from that location. Thus, the Reject mechanism must be apprised of which product is coming along the conveyor that was earlier determined to be out of tolerance. In fact, there are several products that are continually monitored at one time and when a particular product arrives in front of the first Reject station, its corresponding memory location is examined to find out whether that product had earlier been determined to be within or outside of predetermined tolerances.

As a particular product passes in front of the air jet at the first Reject station and it is determined to have been a good product, then the reject air jet is disabled and the product continues along the conveyor path. If the information stored concerning the product passing in front of the air jet indicates that it was out-of-tolerance, the air jet is energized and remains so for a period of time corresponding to the actual measured length of the product.

To ensure that any defective products are pushed laterally off the conveyor belt into a reject hopper, a second air jet station is provided which is a short distance downstream from the first jet. The second reject jet is found useful when the product is of a size that presents a low area profile to the jet. The reject control software times the application of the jet of air from the second jet as well.

In addition to monitoring product size and location on the belt, the Reject subroutine also performs a product inventory function. Specifically, a record is kept of the number of products which fail inspection and that number becomes available to the operator so that adjustments can be made in the production equipment whereby conforming product will be produced.

With the foregoing general functional description in mind, by referring to the flow diagrams relating to the Reject routine, it is to be noted that it, too, works on the same eight-millisecond cycle common to the complete high-speed feeder and, as such, the "watchdog bit" is set as a means of insuring that the software execution occurs within predetermined time constraints. If more than the predetermined time elapses, an error condition is indicated. Next, a test is made to determine whether a product is under eye 1, which is the photocell which is blocked so long as a product is present. If no product is being scanned, certain tasks are executed to update system information. If a product is present, a test is made to determine if a so-called Pointer flag is set. If not, a current pointer number is assigned to that product being scanned. The previous information contained in a FIFO memory related to that reassigned product number is cleared out, readying that memory location for fresh incoming data. The Pointer flag is then set and, following that, a test is made to determine if the Reject flag is set.

The scheme of using a pointer flag insures that upon each iteration through the Reject software certain initialization steps can be bypassed when those steps have already been executed on a prior path through the loop. This avoids needless repetition when it is considered that each product passing along the belts from the sensing location to the reject station are sampled many times.

The Reject flag performs a similar function. If, for example, a product is found to be out of tolerance by one of the sensing eyes, the Reject flag gets set so that it would no longer be necessary to re-execute all of the software operations reflected in the flow chart if that product has already been determined to be out of tolerance. When the Reject flag is not set, however, a series of tests are conducted to determine whether the product is too wide, too thin, too long or too short. Such a determination on a first pass results in the setting of the Reject flag and this advises the system on a subsequent pass that the inspection steps need not be repeated for that product.

Associated with each product disposed between the inspection station and the reject station is a specified memory location whose contents are continually updated so as to, at all times, reflect that particular product's location. It will also be noted from the Reject software flow chart that any time product is determined to be a reject, exit is made to the RJCOUNT operation block in FIG. 5(j). The function of that operation and the immediately subsequent test is to perform a location up-date. That is, the memory locations assigned to each of the products between the inspection station and the reject station are updated to provide current information as to the progress of that product down the line.

It is the object of the RJCOUNT operation to determine in the first instance if there is a rejected product reflected in the Reject flag byte. The flag byte is eight-bits in length and, as such, eight separate products can be tracked at all times. By examining the individual bits of the Reject byte word, it will be immediately indicated which of the plural products is out of tolerance and should not reach the wrapper. The software representing the reject sequence (REJ) is entered. This routine checks to see if a product previously determined to be defective is in position to be swept from the conveyor by the air jets and, if so, the air nozzles are energized to reject the product. If not, control returns until such time as a defective product has reached the rejection station.

TRANSITION BELT CONTROL ROUTINE—FIG. 5(l)

As it was indicated earlier, as products leave the accumulation conveyor 36, they enter the transition conveyor 42 driven by a DC motor M3. The software control algorithm for controlling the motor M3 is illustrated in FIG. 5(l).

Basically, the transition conveyor has two modes of operation. The first is a Fixed Speed mode which occurs when the level of inventory is below the minimum value for the wrapper to be running. That speed is calculated to be slightly under the speed that the accumulator belt 36 is running. As a result, there will be a slight closing of the gap between adjacent products as those products go from the accumulator belt to the transition belt. In the second mode of operation, the speed is slightly faster than that of the backlog belt so that whatever gap has not closed as the product moves from the accumulator belt to the transition belt, it will be closed between the transition belt and the backlog belt. Simply stated, the speed of the transition belt motor M3 is computed and a test is made to determine whether that speed is less than a prescribed minimum speed. If so, the minimum speed value controls the motor. However, if the calculated speed is greater than the minimum, a speed relating to the master tachometer on the wrapper is used to control the motor M3.

Figure 5M:
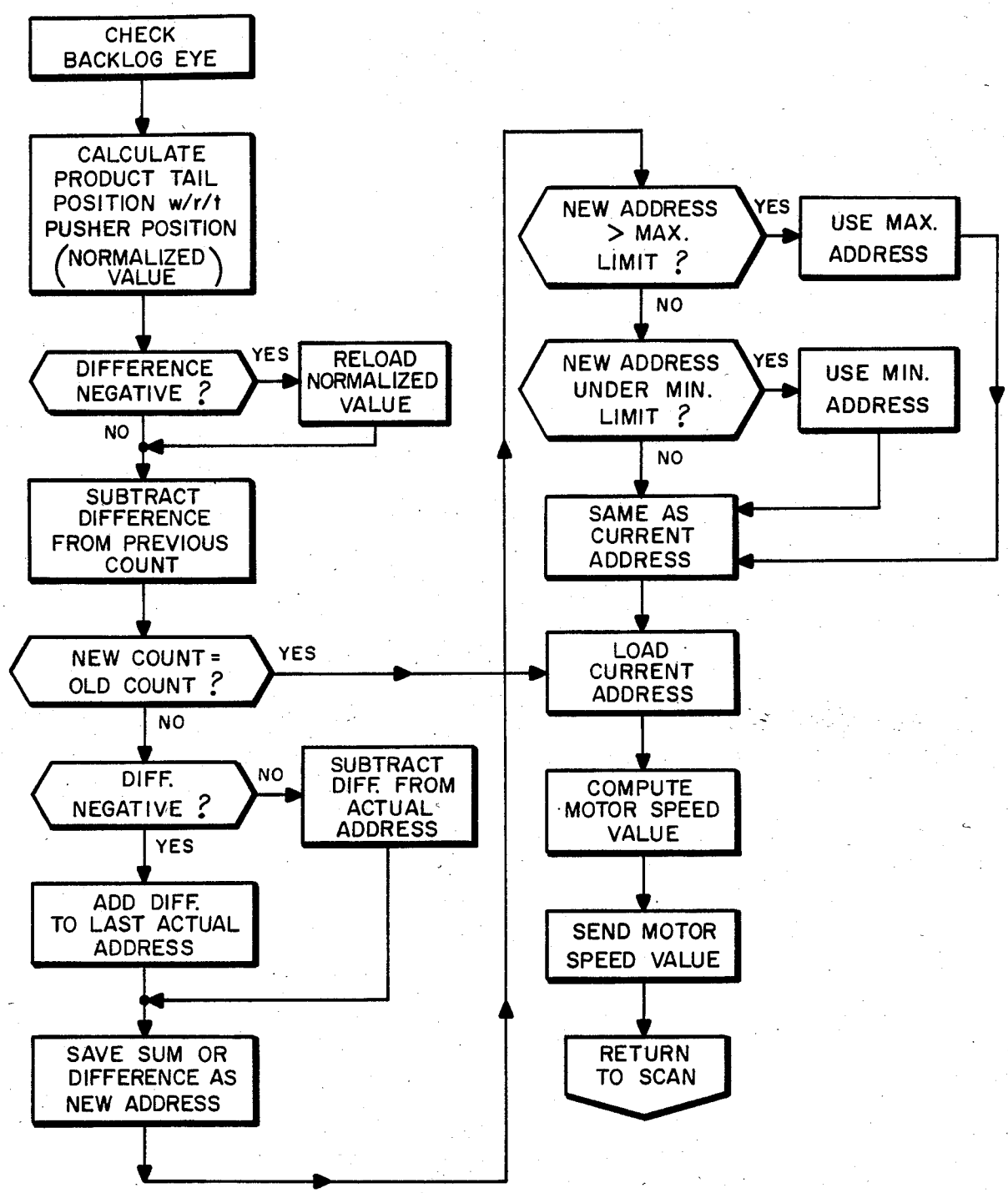

BACKLOG BELT SUBROUTINE—FIG. 5(m)

The backlog belt is controlled so as to run at a speed of one product per wrapper flight where the wrapper flight is the spacing between two adjacent pusher fingers on the infeed chain. A further function of the backlog belt is to appropriately time the products as they exit the backlog belt so that they will arrive in synchronism with an infeed chain flight when that product ultimately reaches the infeed chain.

In implementing this function, an electric eye is provided which is positioned to view the area between the backlog belt and the separation belt. The leading edge of each product is examined by this electric eye and when it is detected, a check is made to determine where that product is with respect to an encoder that is physically attached to the infeed chain. If, for any reason, the timing is off, the software develops a control signal for the backlog belt to proportionally change its speed so that by the time that the trailing edge of that product is detected, the product will be synched with the flighted chain of the infeed conveyor.

Should it happen that a product arrives under the backlog eye that is slightly shorter than the product length parameter originally entered by the operator during the Set-up mode, but its leading end is in exact synchronization, then the next product arriving would be early in that, by definition, backlog means that the products are touching end-to-end. Because the time increment of the early arrival is directly proportional to the product length difference, i.e., the difference between the actual product length and the ideal product length, a computation is made to yield a new speed which is exactly equal to the slight decrease in speed necessary for the shorter product. This is an on-going calculation on a product-by-product basis and only when an error is sensed is the speed changed, that change in speed being proportional to the position error observed.

In the flow diagram of FIG. 5(m), the location error or a newly-arriving product at the backlog belt is determined by subtracting the actual product location from the desired location. If the two counts are the same, a previous speed command will be sent to the motor for the backlog belt, and operation will continue. However, if the actual product position count is different from the desired count, it means that the belt speed will have to be modified to accommodate the position error because of the irregular length of the preceding product. The speed-modifying parameters are stored in a memory at addressable locations. The addresses for the speed-modifying parameters are computed by modifying a previous address with a position count value in a table look-up approach. In that the necessary speed adjustment is proportional to the degree of difference between the ideal product location and the actual product location, this difference can be used as an address-modifying parameter to locate the appropriate speed adjustment factor to be applied to the motor controlling the backlog belt.

Figure 5N:
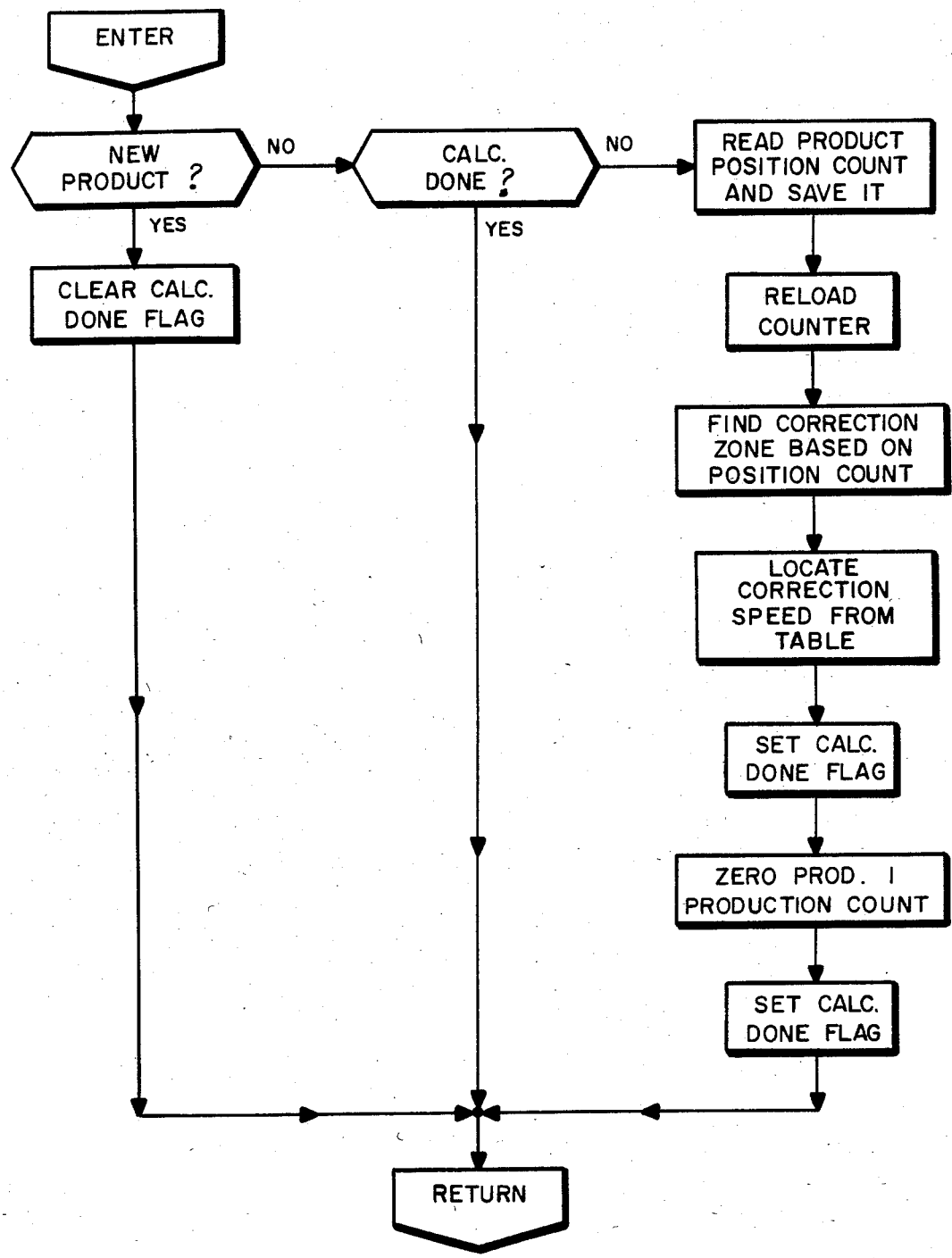
Figure 5O:
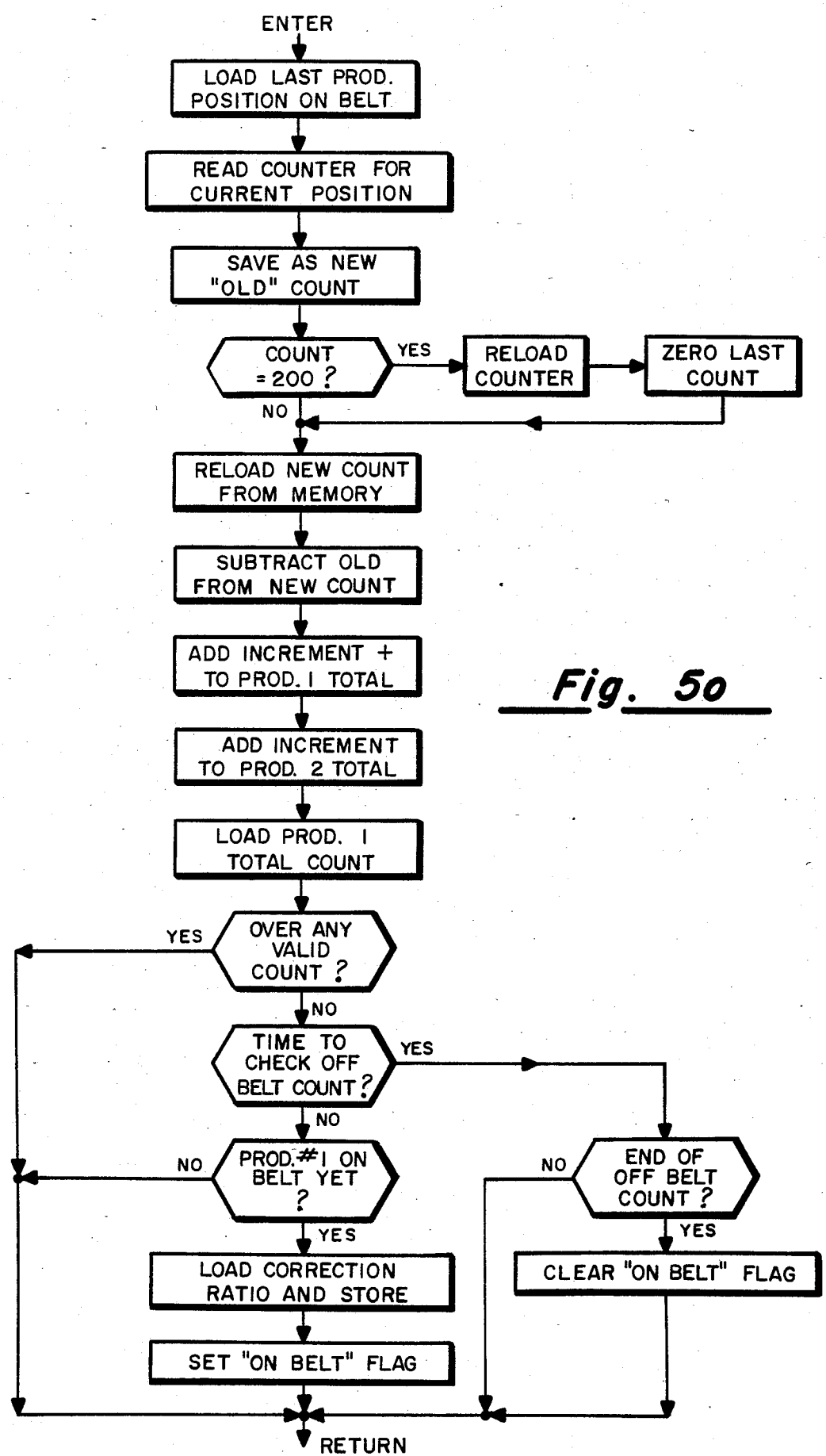
Figure 5P:
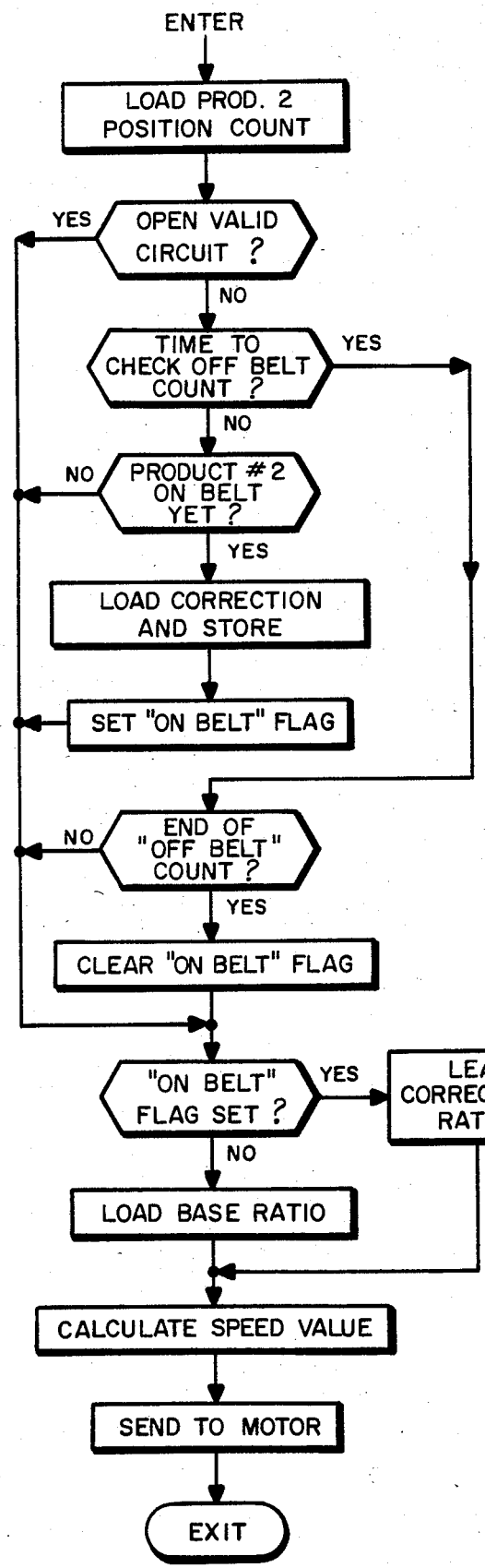
Figure 5Q:
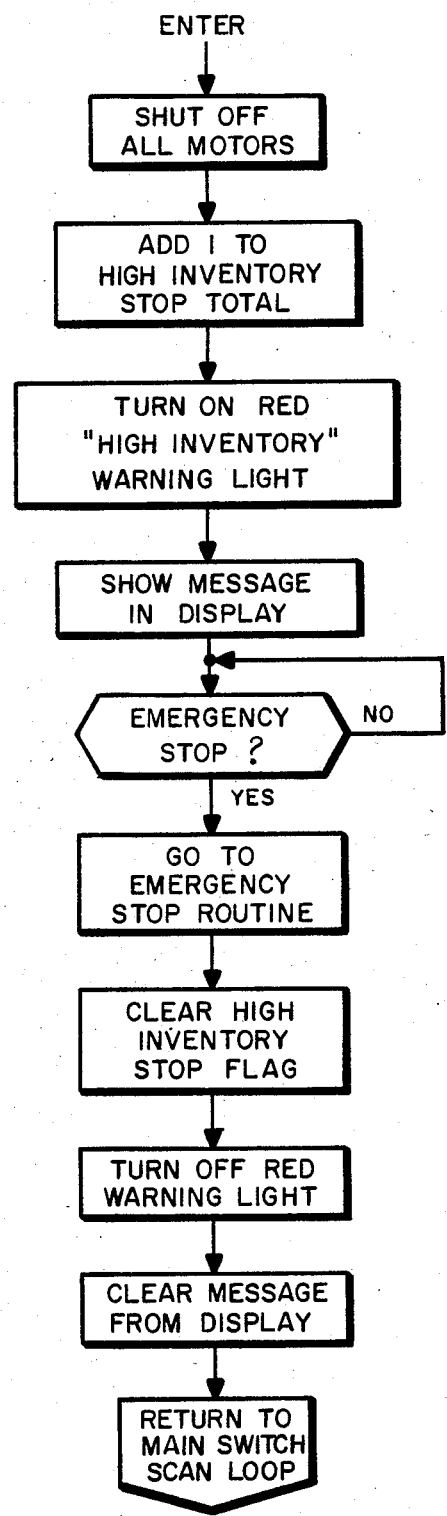

CORRECTION BELT ROUTINE—FIG. 5(n)–5(p)

The basic function of the correction belt software is to cause the product on the separation belt to be sensed so as to compare its present location with its ideal location relative to the flights of the infeed conveyor. If an error is detected, it is converted, again through a table look-up operation, to a speed change that is to be imparted to the correction belt motor at the time that the product in question actually reaches the correction belt. In that there is space for more than one product between the location of the photoelectric eye defining where a product is and where the correction is actually accomplished, it is necessary to keep track of the location of each of the individual products between those two points. When a product arrives on the correction belt such that a corrective speed change can be imparted to it, a check is made to determine what the particular speed correction has to be for that product as determined at the upstream sensing point. The speed of the correction belt is then adjusted, either up or down, until the appropriate speed change has been imparted to it. Then, when the product in question leaves the correction belt, the speed of the correction belt again is shifted to a speed value ready to accept the next product as it comes along.

From the above, it should be apparent that the present invention provides for a microprocessor-controlled feeder conveyor and system whereby product is synchronously supplied to each of a plurality of wrapping stations via an associated controller feeder having a plurality of speed-controllable conveyors. Depending upon a plurality of preprogrammed product and system parameters, the system automatically operates to inspect each product and deliver acceptable products to the high-speed wrapping machine 20. While, too, the present invention has been described with respect to its presently preferred embodiment, it is to be recognized that various modifications, some of which have been mentioned, may be made thereto by those of skill in the art. To the extent such modifications fall within the spirit and scope of the present invention, it is accordingly contemplated that the following claims shall be interpreted so as to encompass all such equivalent embodiments.

What is claimed is:

1. In a conveyor system, apparatus for randomly receiving product from a longitudinally extending supply conveyor in rows and conveying the product to a selected one of a plurality of work stations by way of a plurality of transversely extending branch conveyor means, each branch conveyor means, comprising:

first conveyor means extending transverse to said longitudinally extending supply conveyor for simultaneously receiving a plurality of products from said supply conveyor, a row at a time, and conveying them in a predetermined orientation with respect to one another and with random spacing therebetween;

second conveyor means disposed downstream from said first conveyor means and electronically feedback coupled to sense the speed of operation of said selected one of said plurality of work stations for accumulating and partially backlogging said products as they are conveyed along said second conveyor means; and third conveyor means disposed downstream from said second conveyor means and coupled to said selected one of said plurality of work stations for separating each of said products from one another by a predetermined spacing and correctively adjusting said spacing so as to synchronize the position of products spaced on said third conveyor means with a fourth conveyor means of the type having a plurality of spaced-apart pusher members mounted on an endless chain and with adjacent ones of said pusher members defining flights for synchronously receiving said products within said flights and conveying said product to said selected one of said plurality of said work stations.

2. Apparatus as set forth in claim 1 wherein said second conveyor means includes inspection means for photo-electrically comparing said product with a plurality of predetermined product specification parameters and rejecting those products not conforming to said parameters.

3. Apparatus as set forth in claim 2 wherein said inspection means includes means for measuring the length, width and height of each of said products and comparing the measurements with said specification parameters.

4. Apparatus as set forth in claim 1 wherein said second conveyor means comprises first, second and third serially disposed, rate-controlled, motor-driven conveyor belts for successively receiving products and controllably varying the position of said products on said conveyor belts in synchronization with the movement of products through said work station disposed at the end of said third conveyor means.

5. Apparatus as set forth in claim 4 wherein each of said first, second and third conveyor belts are proportionally driven by a plurality of associated switchable controllers, each of said controllers being feedback coupled to tachometer means coupled to said work station.

6. Apparatus as set forth in claim 1 wherein the drive speed of said first conveyor means is determined by the presence of product at a diverter shelf along said supply conveyor and by the relative position of the preceding row of previously supplied products on said first conveyor means so as to accelerate or decelerate said first conveyor means and thereby synchronize the preceding row of previously supplied products to the next row of products arriving on said first conveyor means from said supply conveyor.

7. A feeder conveyor assembly for synchronously supplying product to a work station, comprising in combination:
   a first speed controlled conveyor for receiving randomly distributed product;
   a second speed controlled conveyor disposed downstream from said first conveyor for receiving product from said first conveyor and partially backlogging said product on said second conveyor in a head-to-tail contacting serial stream;
   a third conveyor disposed downstream from said second conveyor for receiving product from said second conveyor and controllably backlogging said product on said third conveyor relative to the rate of flow of product through said work station;
   a fourth conveyor for receiving product from said third conveyor for separating said products by a predetermined spacing from one another corresponding to the spacing between a plurality of pushing members disposed on an infeed conveyor of said work station; and
   microprocessor control means including memory means for storing a plurality of preprogrammed subroutines, means for monitoring the product on said first, second, third and fourth conveyor means and said work station for compliance with a plurality of preprogrammed parameters stored in said memory means; and means including said microprocessor control means for controlling the speed of said first, second, third and fourth conveyor means relative to the speed of said work station, whereby said products are synchronously received between said pushing members of said infeed conveyor of said work station.

8. A feeder conveyor assembly as set forth in claim 7 wherein said means for monitoring includes a plurality of photo-electric transmitters/receivers disposed proximate said first conveyor for sensing the presence of products thereon; a plurality of position encoders coupled to said first, conveyor and to said infeed conveyor, said plurality of transmitters/receivers and encoders producing control signals for said processor control means.

9. An assembly as set forth in claim 8 wherein said photo-electric transmitters/receivers monitor the relative length, width and height of each of said products.

10. An assembly as set forth in claim 9 including an air delivery reject station positioned downstream of said photo-electric transmitters/receivers for controllably ejecting product from said feeder conveyor assembly in response to reject signals generated by said microprocessor control means when said products fail to comply with said preprogrammed parameters.

11. A conveyor system for transporting products from a supply station to a horizontal wrapping machine, comprising:
   first motor-driven conveyor means disposed downstream of said supply station for receiving products and aligning same in spaced rows;
   second motor-driven conveyor means extending transverse to said first conveyor means;
   diverter means including a storage shelf disposed along said first conveyor means and in lateral alignment with said second conveyor means for receiving said rows of product from said first conveyor means and intermittently diverting said rows laterally onto said second conveyor means;
   first sensing means for sensing the presence of rows of product on said storage shelf;
   second sensing means for detecting the location of a predetermined product in a row of product previously deposited on said second motor-driven conveyor means; and
   control means responsive to said first and second sensing means and coupled in a speed controlling relation to the motor of said second motor-driven conveyor means for adjusting the speed of movement of said second motor-driven conveyor means.

12. The conveyor system as in claim 11 wherein said control means includes a programmed microprocessor means.

13. The conveyor system as in claim 12 wherein said microprocessor means is programmed to increase the speed of movement of said second motor-driven conveyor means if said predetermined product in a preceding row of product fails to reach a predetermined location on said second conveyor means at the time that a subsequent row of product arrives at said storage shelf.

14. The conveyor system as in claim 12 wherein said microprocessor means is programmed to decrease the speed of movement of said second motor-driven conveyor means if said predetermined product in a preceding row of product reaches a predetermined location on said second conveyor means before a subsequent row of product arrives at said storage shelf.

15. The conveyor system as in claim 14 wherein said microprocessor means is programmed to freeze the speed of movement of said second motor-driven conveyor means at the speed which prevails at the time of arrival of said subsequent row of product at said storage shelf.

* * * * *